(12) United States Patent
Paradiso et al.

(10) Patent No.: US 12,398,748 B2
(45) Date of Patent: Aug. 26, 2025

(54) FASTENING SYSTEM WITH ROTATABLE LOCKING BOLT

(71) Applicant: Mod Innovations, LLC, Arlington, MA (US)

(72) Inventors: Jeff Paradiso, Arlington, MA (US); John William Markelz, III, Arlington, MA (US)

(73) Assignee: Mod Innovations, LLC, Arlington, MA (US)

( * ) Notice: Subject to any disclaimer, the term of this patent is extended or adjusted under 35 U.S.C. 154(b) by 0 days.

(21) Appl. No.: 19/041,675

(22) Filed: Jan. 30, 2025

(65) Prior Publication Data
US 2025/0251012 A1    Aug. 7, 2025

Related U.S. Application Data

(60) Provisional application No. 63/550,487, filed on Feb. 6, 2024.

(51) Int. Cl.
F16B 21/02     (2006.01)
F16B 35/04     (2006.01)
F16B 39/02     (2006.01)

(52) U.S. Cl.
CPC ............. *F16B 39/02* (2013.01); *F16B 21/02* (2013.01); *F16B 35/04* (2013.01)

(58) Field of Classification Search
CPC ............. F16B 5/10; F16B 21/02; F16B 21/04
USPC ......................................... 411/349, 549, 553
See application file for complete search history.

(56) References Cited

U.S. PATENT DOCUMENTS

| | | | | |
|---|---|---|---|---|
| 1,305,311 A | * | 6/1919 | Sheldon | F16B 21/02 |
| | | | | 279/93 |
| 3,298,071 A | * | 1/1967 | Flora | F16B 21/02 |
| | | | | 24/297 |
| 3,929,339 A | | 12/1975 | Mattioli | |
| 3,986,780 A | * | 10/1976 | Nivet | F16B 21/02 |
| | | | | 411/908 |
| 5,502,989 A | * | 4/1996 | Murray, Jr. | E05B 73/0005 |
| | | | | 70/57 |
| 5,685,543 A | | 11/1997 | Garner | |

(Continued)

OTHER PUBLICATIONS

Bolt N Play Construction Set from Ideal 1980: Jan. 1, 1980, 2 pages, toytales.ca /bolt-n-play-construction-set-from-ideal-1980/.

(Continued)

*Primary Examiner* — Flemming Saether
(74) *Attorney, Agent, or Firm* — Blueshift IP; Robert Plotkin

(57) ABSTRACT

A fastening system includes a bolt having a head, a shaft member defining an axis of rotation, and a locking member with wings. The bolt is insertable into a receiving hole formed in a surface, wherein upon rotation of the bolt from an initial orientation to a second orientation, the wings engage with underside surfaces of the receiving hole to prevent withdrawal. A locking mechanism is insertable through aligned holes in the shaft member after rotation to prevent both rotation and removal of the bolt. The locking mechanism may be configured for removal from either an interior side or exterior side of the surface. The system enables secure connections that can be easily assembled and disassembled while supporting objects between the bolt head and surface.

16 Claims, 13 Drawing Sheets

(56) References Cited

U.S. PATENT DOCUMENTS

| | | | |
|---|---|---|---|
| 6,305,199 B1* | 10/2001 | Igelmund | E05B 73/0005 70/32 |
| 2005/0276677 A1* | 12/2005 | Andersson | F16B 21/02 411/553 |
| 2006/0205519 A1 | 9/2006 | Soltys | |
| 2017/0066506 A1* | 3/2017 | Klein | B63B 21/04 |
| 2024/0327067 A1 | 10/2024 | Alexander | |

OTHER PUBLICATIONS

Erector Set: Jan. 23, 2004, 5 pages, en.wikipedia.org /wiki/Erector_Set.
Handcrafted Wooden Trolley Box Facebook: Oct. 31, 2017, 3 pages, www.facebook.com/photo/.
Handcrafted Wooden Trolley Box: Oct. 31, 2017, 8 pages www.decoryear.com /products/handcrafted-wooden-trolley-box-beautiful-trolley-box.
Ikea Klämmemacka Desk organizer natural plywood: Dec. 1, 2020, www.ikea.com /us/en/p/klaemmemacka-desk-organizer-natural-plywood-50428815/, 4 pages.
Klaemmemacka-desk-organiser-natural-plywood_AA-2134643-2_pub: Dec. 1, 2020, 12 pages.
MagHolder: date unknown, 11 pages, https://kickstartech.com/games/magholder-multi-functional-modular-card-token-holding-box/.
Modular Mini Card Deck Holder System—Etsy: date unknown, 2 pages, https://www.etsy.com/listing/1242003905/modular-mini-card-deck-holder-system.
Rare Vintage Boltn Play Ride on Building Set Ideal Toy Corp Plastic Collectible: Jan. 1, 1980, www.ebay.com / itm/ 166948394975, 25 pages.

\* cited by examiner

FASTENING SYSTEM WITH ROTATABLE LOCKING BOLT

CROSS-REFERENCE TO RELATED APPLICATIONS

This application claims priority to U.S. Prov. Pat. App. No. 63/550,487, filed on Feb. 6, 2024, entitled, "Apparatus for Providing a Storage Space," which is hereby incorporated by reference herein.

BACKGROUND

The field of fastening systems and mechanical connectors is technologically important across numerous industries, business organizations, and applications. Fasteners enable the secure joining of components while often needing to accommodate requirements for both permanent and temporary connections.

Traditional fastening approaches typically rely on separate hardware components like screws, nuts, bolts, and other fasteners that must be sourced and maintained as inventory. These conventional systems generally require tools for installation and removal, increasing complexity and assembly time. The need to keep track of loose hardware components also creates logistics challenges and risks of lost parts.

Current technologies in the field of fastening systems have several limitations. Many existing solutions do not provide an effective way to create secure connections that can be easily assembled and disassembled without tools. Additionally, conventional fasteners often lack integrated locking mechanisms, requiring separate locking hardware or adhesives to prevent unintended loosening of the connection.

Furthermore, existing fastening systems frequently do not enable support of additional components while maintaining a secure connection. The field would benefit from improved solutions that address these limitations while reducing reliance on separate hardware components and specialized tools for assembly and disassembly.

SUMMARY

A fastening system includes a bolt that is insertable into a receiving hole and rotated to create a secure connection that prevents withdrawal of the bolt. The bolt includes a head, a shaft member defining an axis of rotation, and a locking member with wings that engage with underside surfaces of the receiving hole when the bolt is rotated.

The system provides a secure connection through a two-stage locking process. First, the bolt's wings engage with underside surfaces of the receiving hole upon rotation, preventing withdrawal of the bolt. Second, a locking mechanism is insertable through aligned holes in the bolt and receiving hole to prevent rotation of the bolt back to its initial orientation.

The fastening system may be implemented in various configurations. For example, the locking mechanism may be removable from either an interior or exterior side of the surface containing the receiving hole. The shaft member may have different cross-sectional shapes while maintaining its ability to define an axis of rotation.

Key benefits of the system include:
Secure fastening without additional hardware.
Easy installation through insertion and rotation
Prevention of both withdrawal and rotation when locked.
Ability to support objects between the bolt head and surface
Reversible locking for temporary or permanent connections The fastening system provides a robust yet simple solution for connecting components while enabling easy assembly and disassembly when desired.

Other features and advantages of various aspects and embodiments of the present invention will become apparent from the following description and from the claims.

DETAILED DESCRIPTION

Figure 1A:
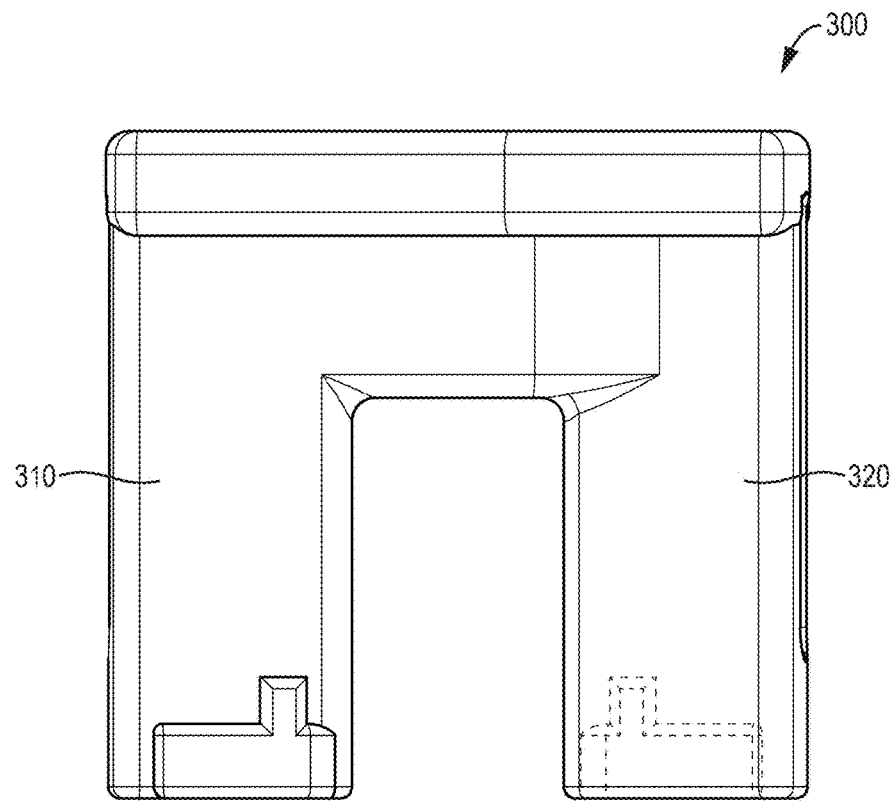
FIGS. 1A-1D are views of locking members implemented according to embodiments of the present invention.
Figure 1B:
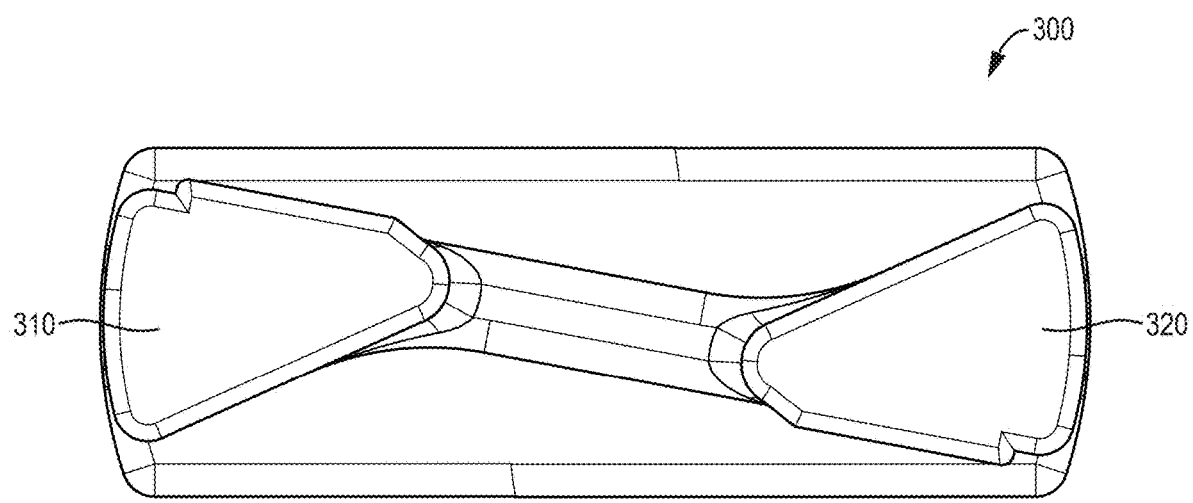
Figure 1C:
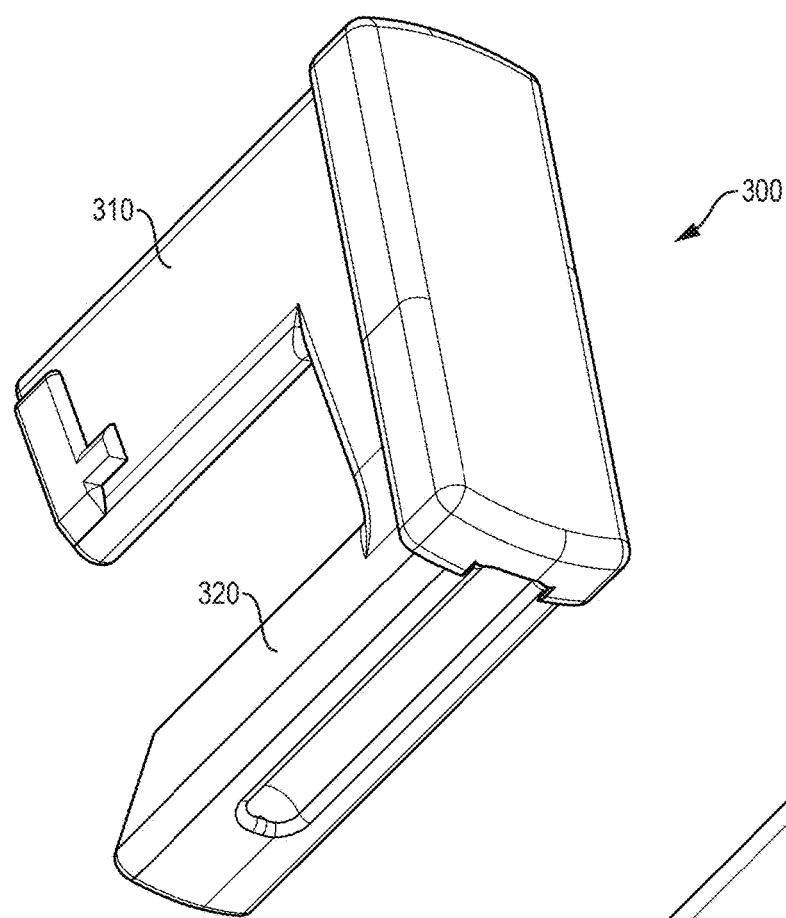
Figure 1D:
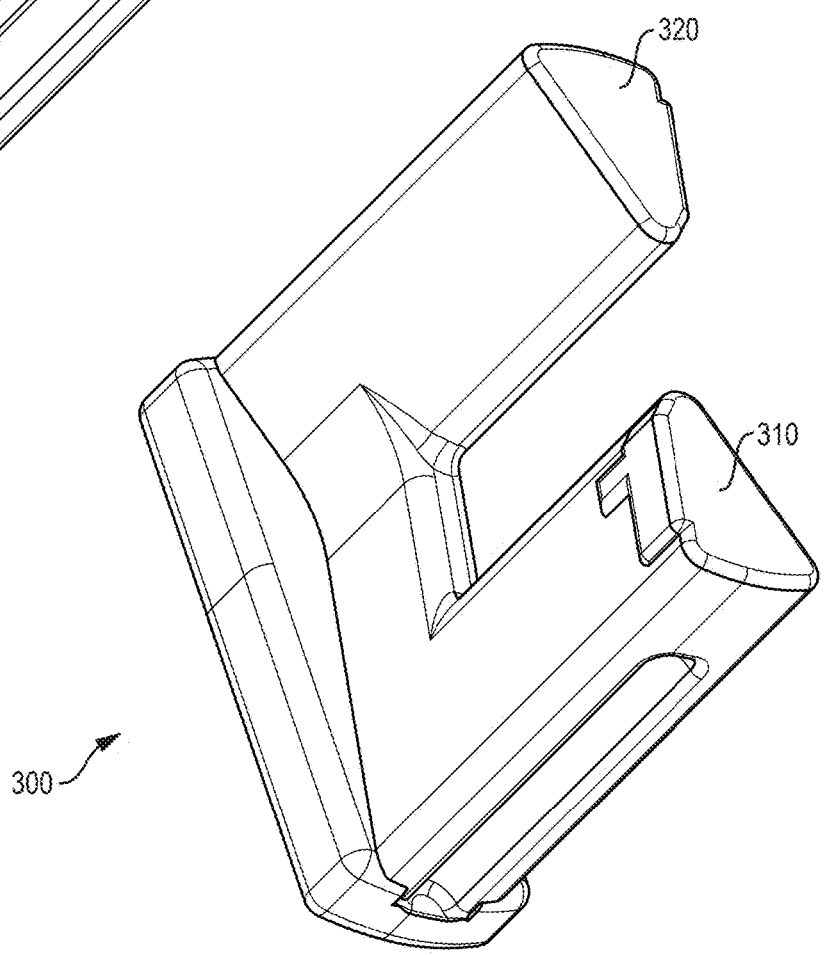
Figure 2A:
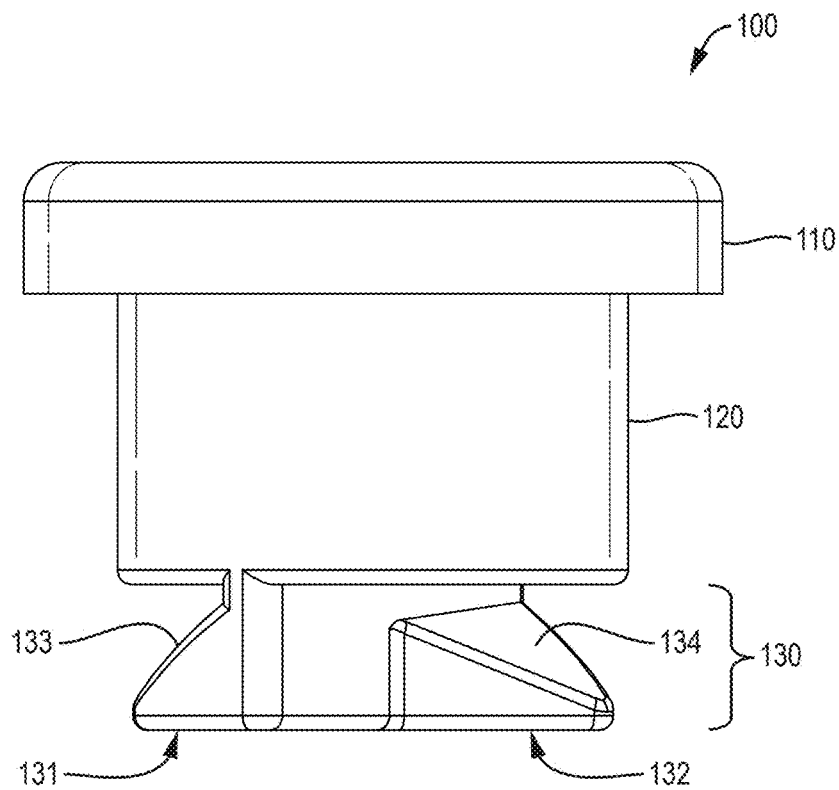
FIGS. 2A-2F are views of embodiments of a bolt implemented according to embodiments of the present invention.
Figure 2B:
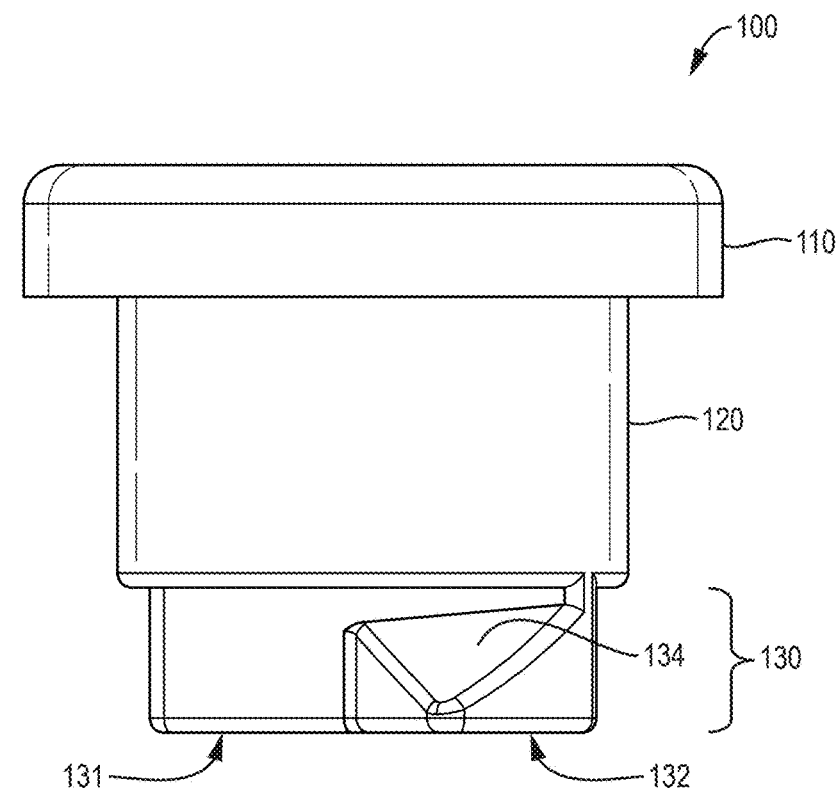
Figure 2C:
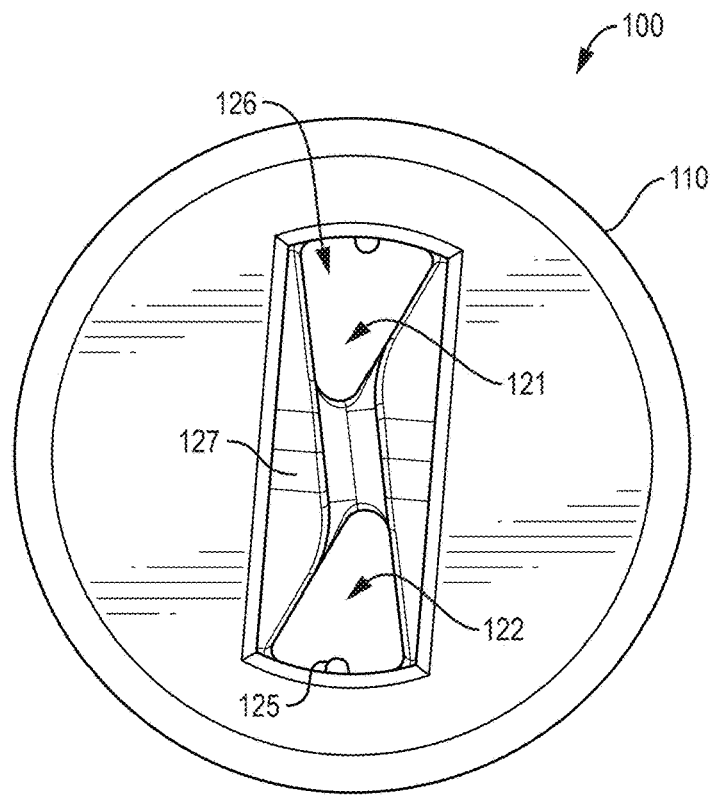
Figure 2D:
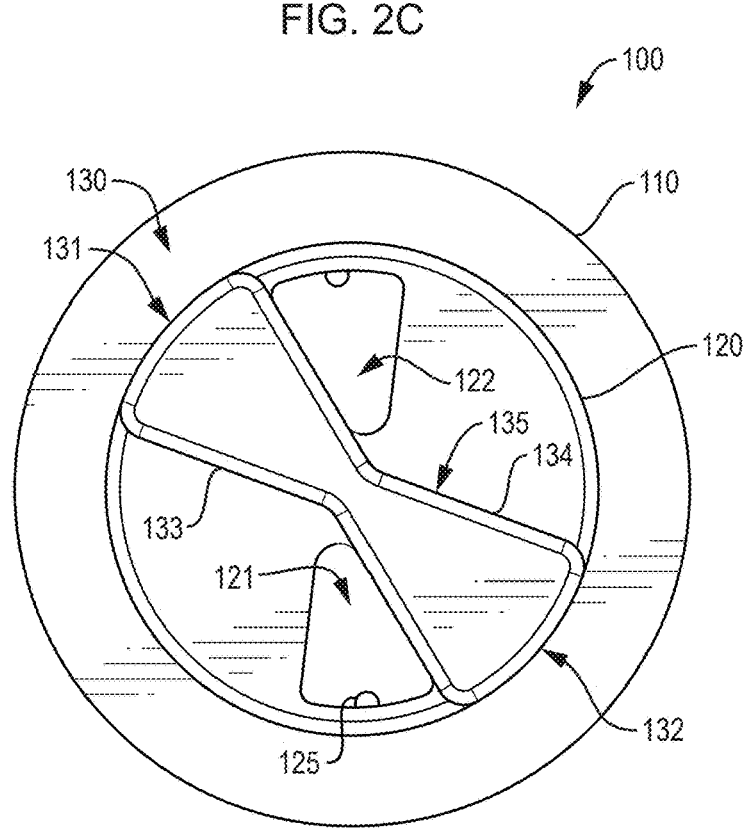
Figure 2E:
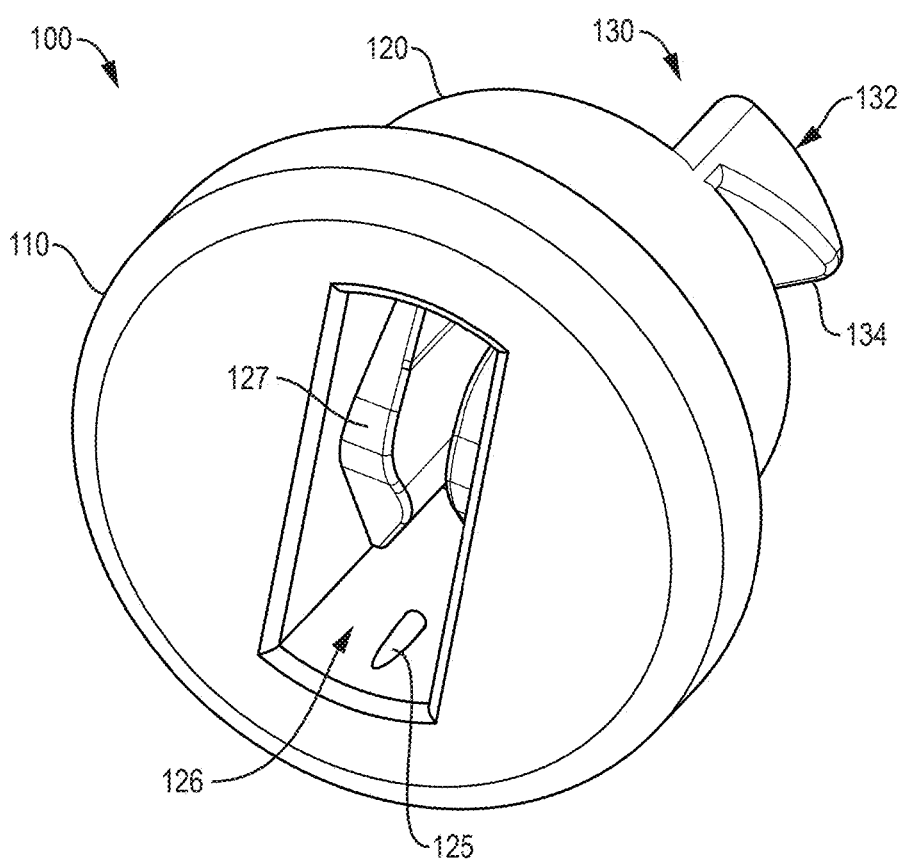
Figure 2F:
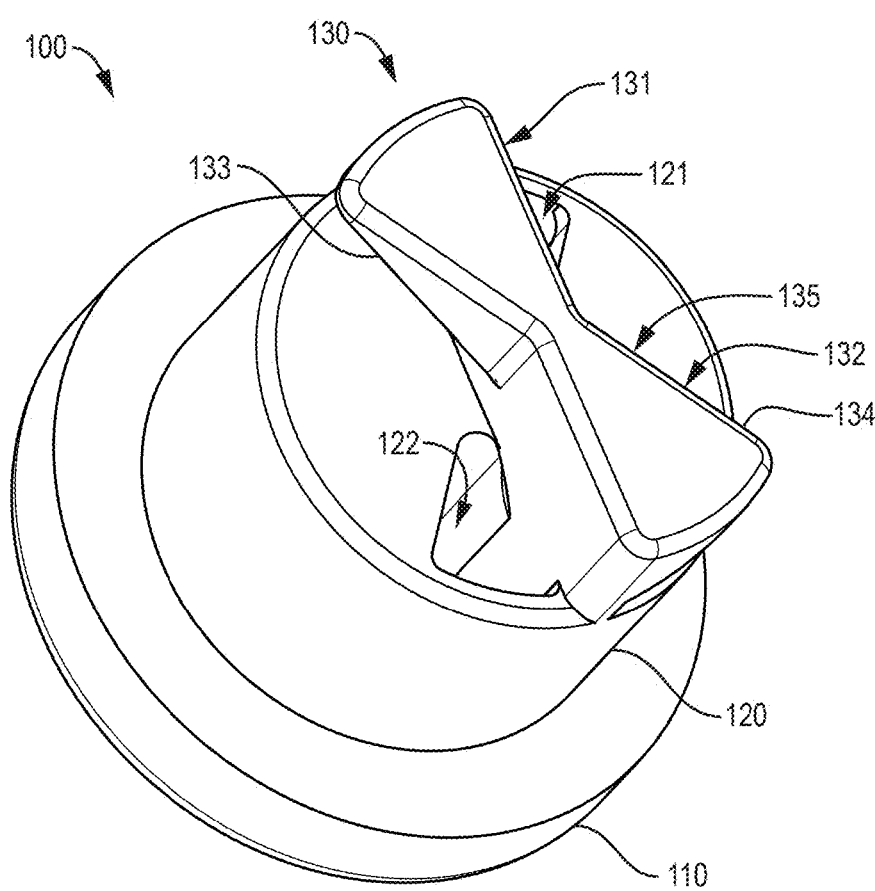
Figure 3:
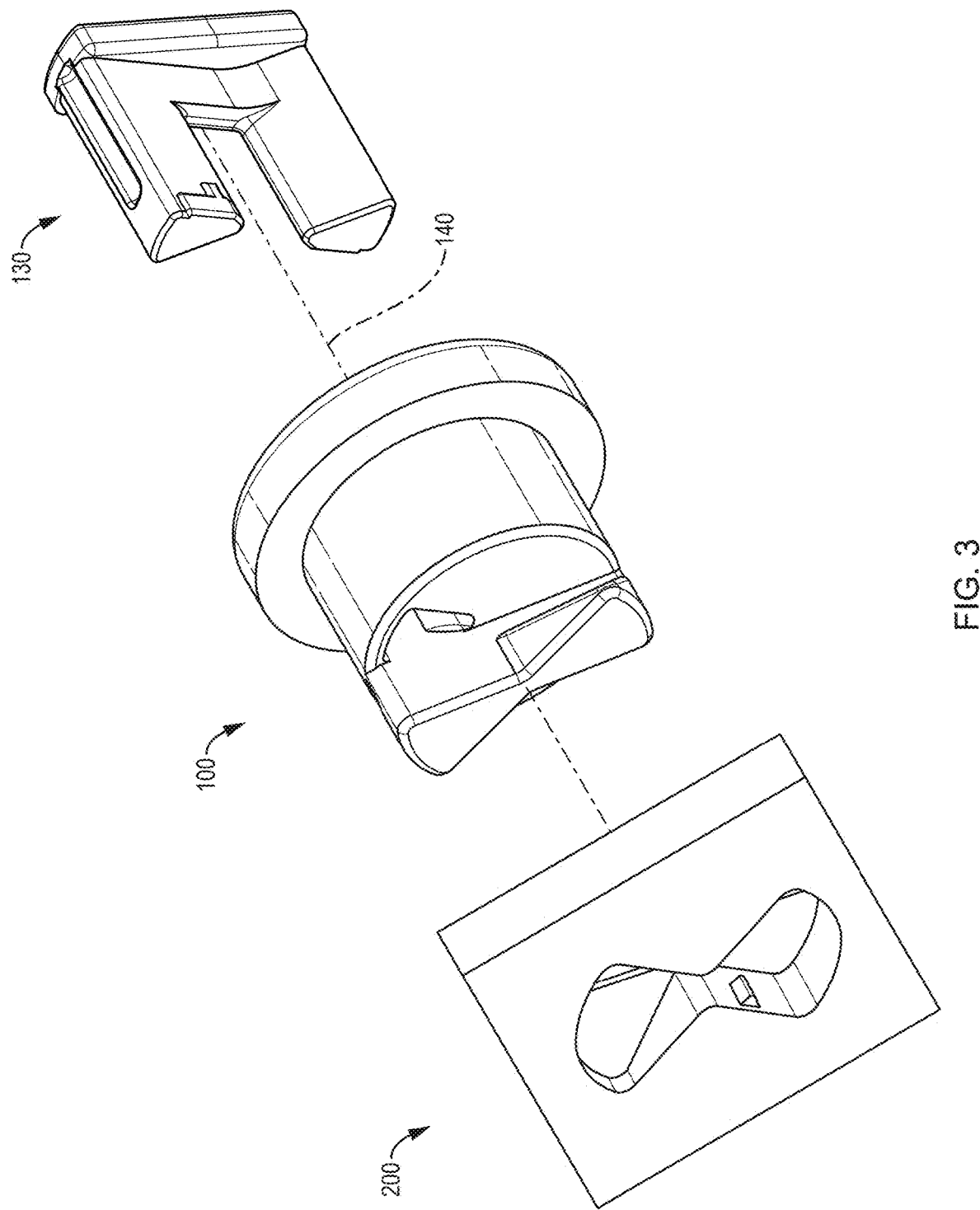
FIG. 3 illustrates interoperation of a locking member, a bolt, and a receiving hole according to an embodiment of the present invention.
Figure 4:
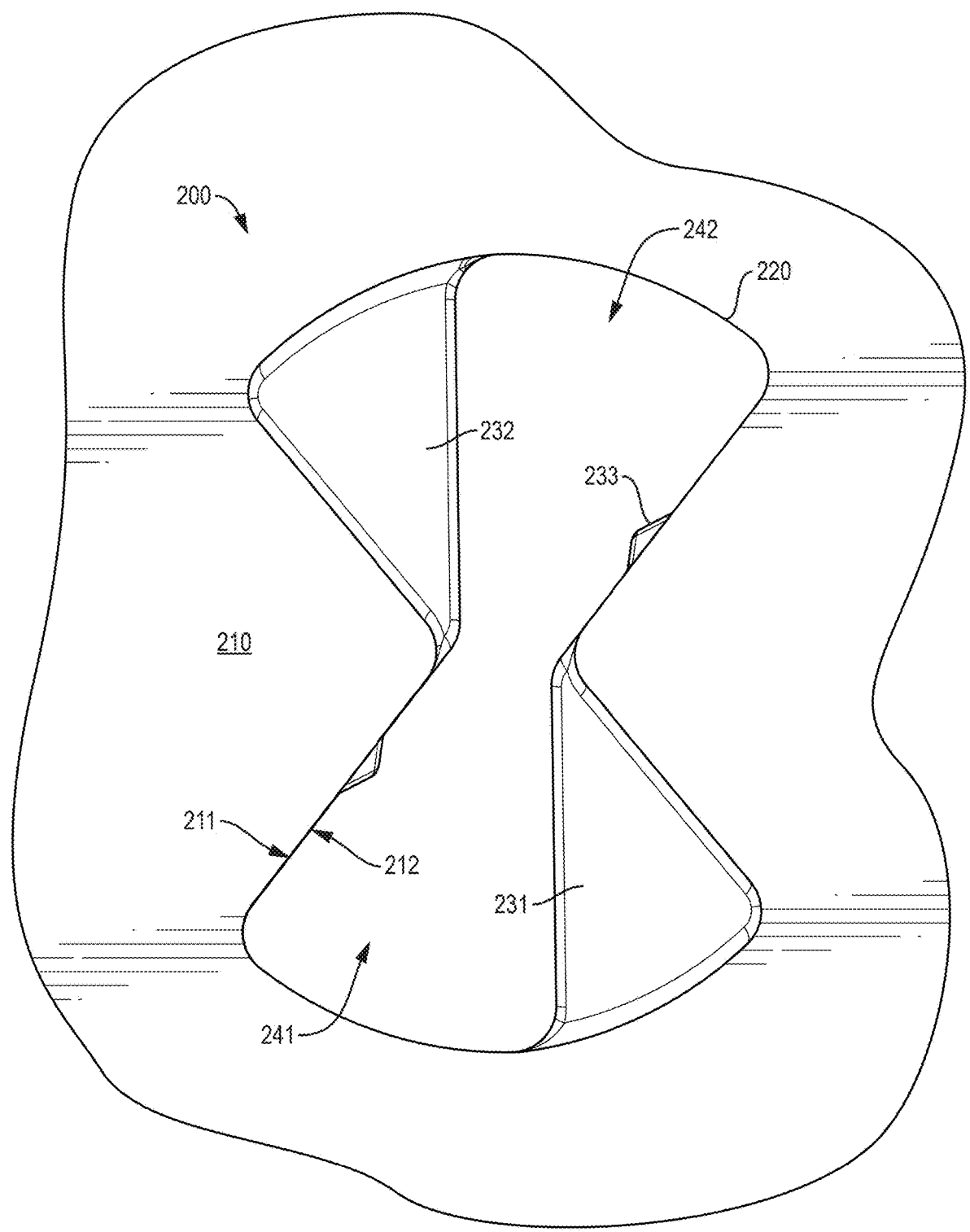
FIG. 4 illustrates a receiving hole according to an embodiment of the present invention.
Figure 5A:
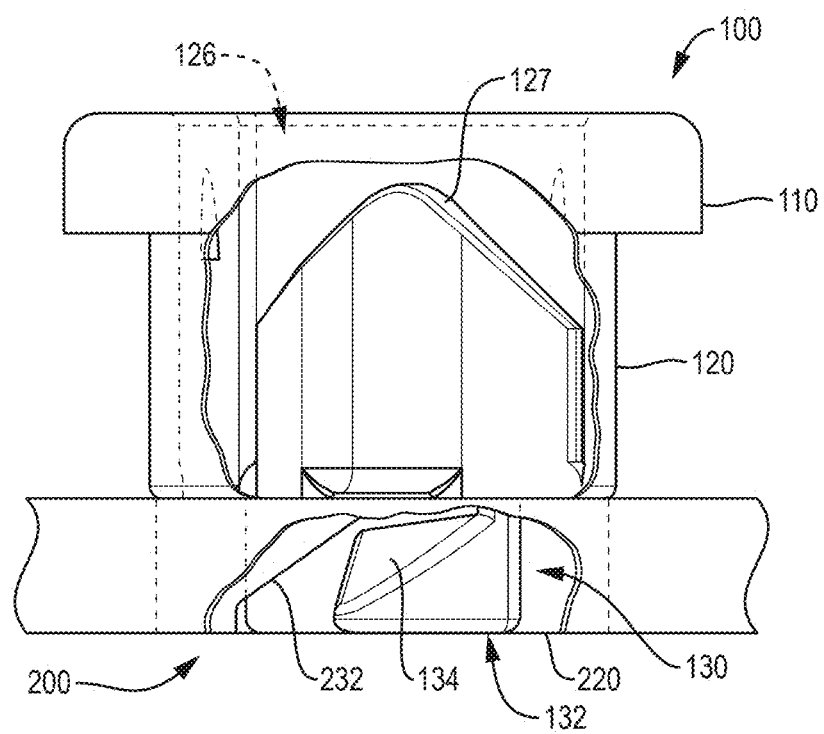
FIGS. 5A-5D illustrate a mechanism of operation of a bolt, a locking member, and a receiving hole according to a non-pop lock assembly embodiment of the present invention.
Figure 5B:
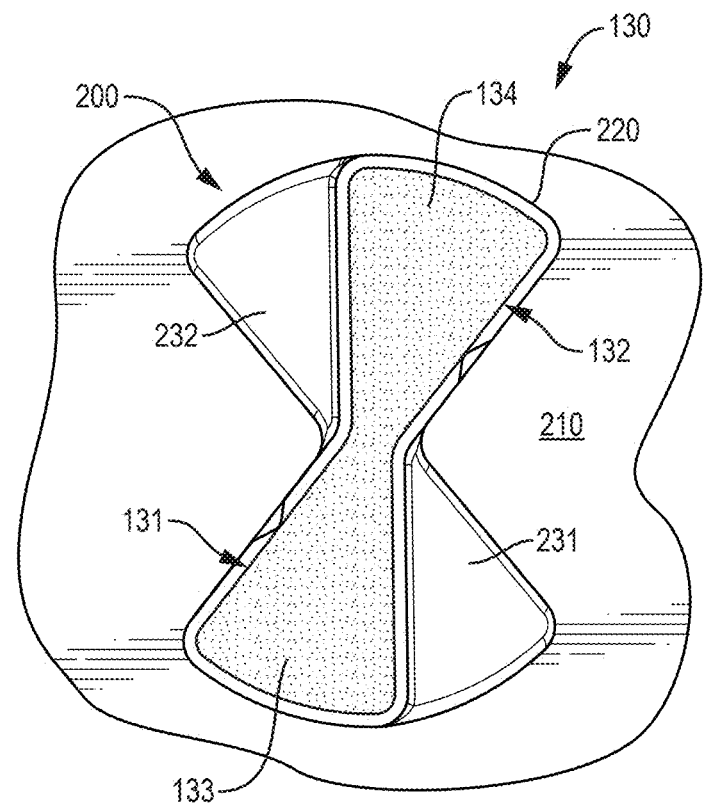
Figure 5C:
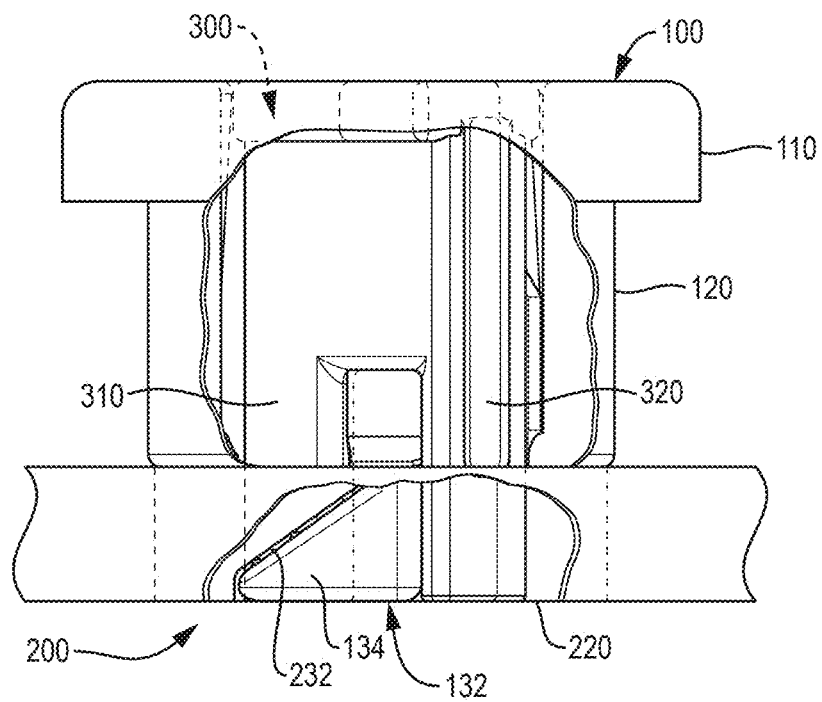
Figure 5D:
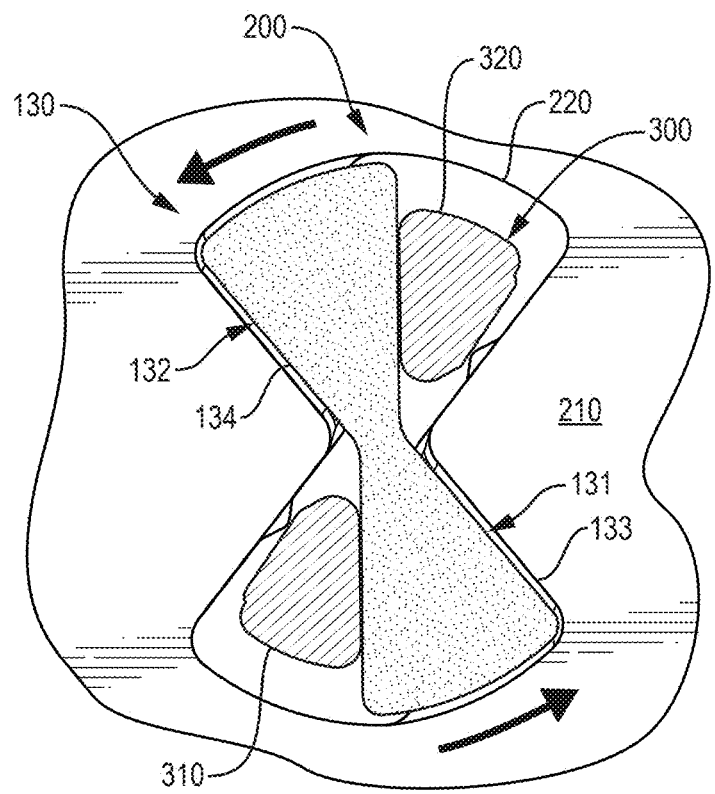
Figure 6A:
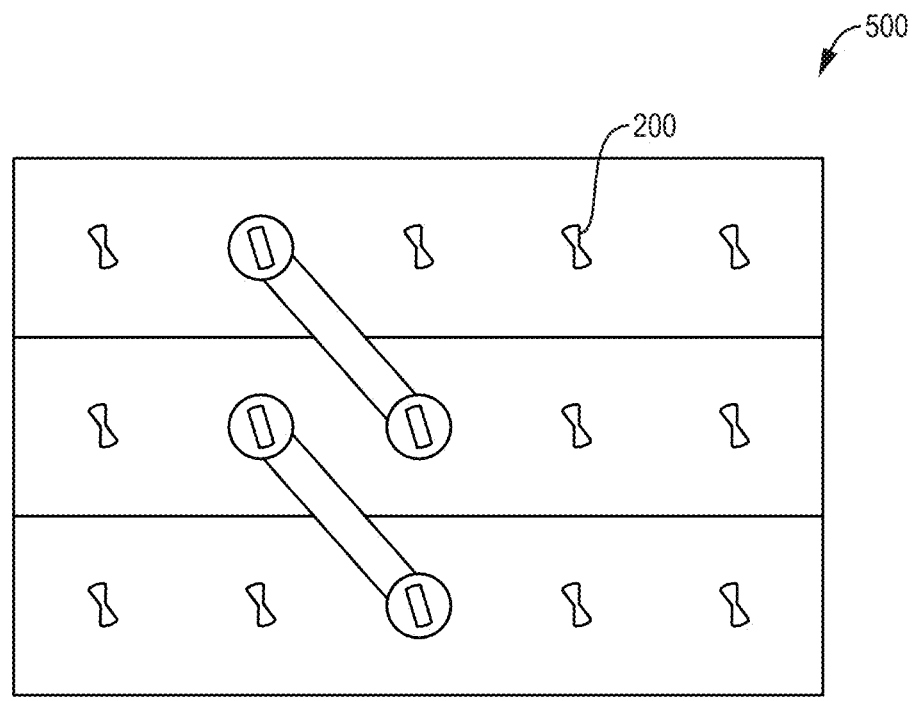
FIGS. 6A-6B illustrate use of an embodiment of the fastening system to attach hinge arms to a supported object according to an embodiment of the present invention.
Figure 6B:
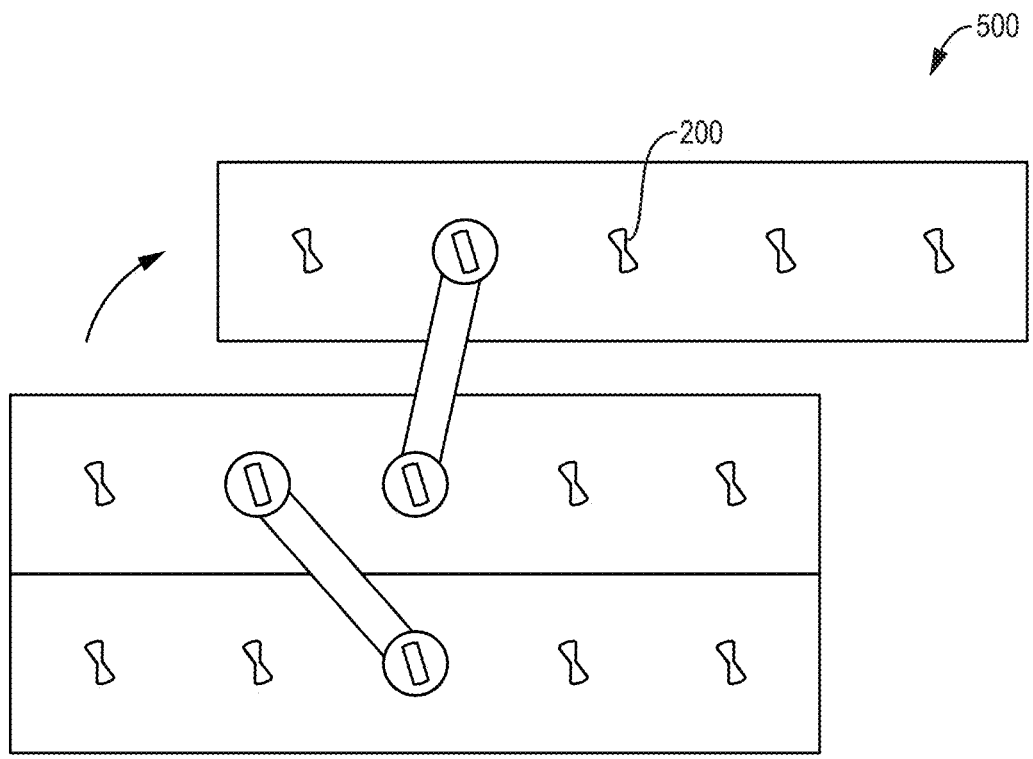
Figure 7A:
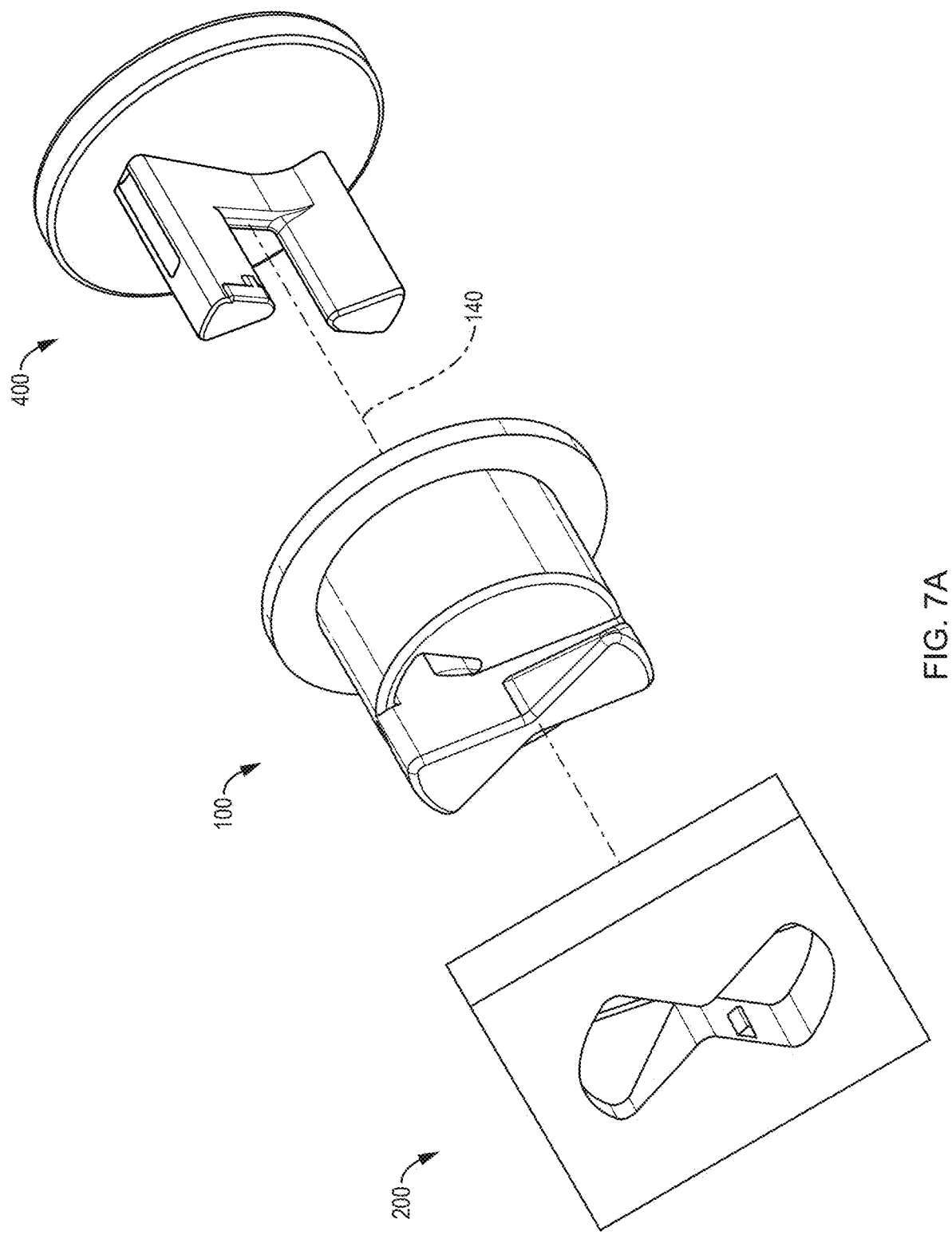
FIGS. 7A-7C illustrate a mechanism of operation of a bolt, a locking member, and a receiving hole according to a pop lock assembly embodiment of the present invention.
Figure 7B:
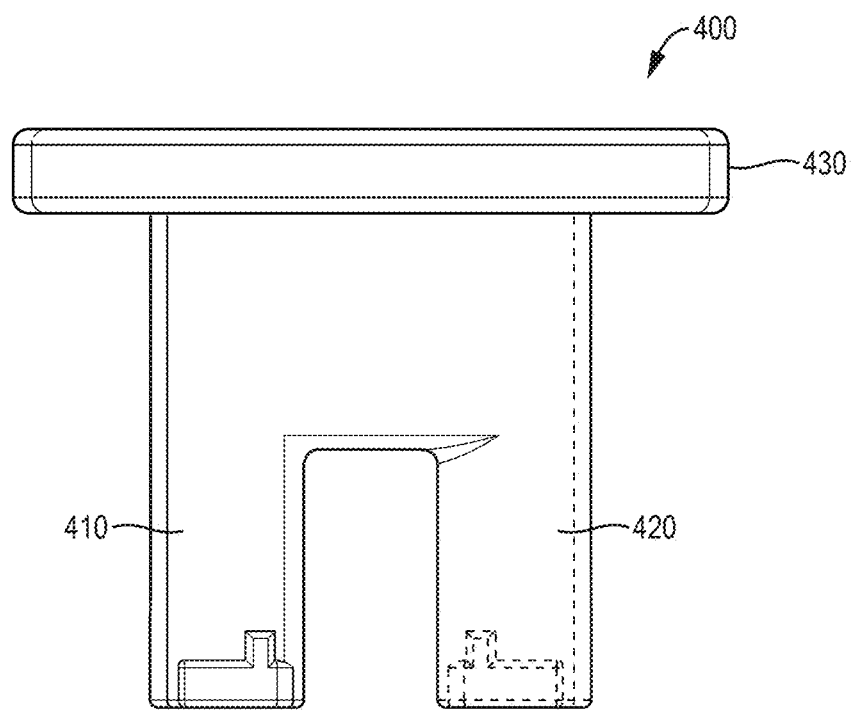
Figure 7C:
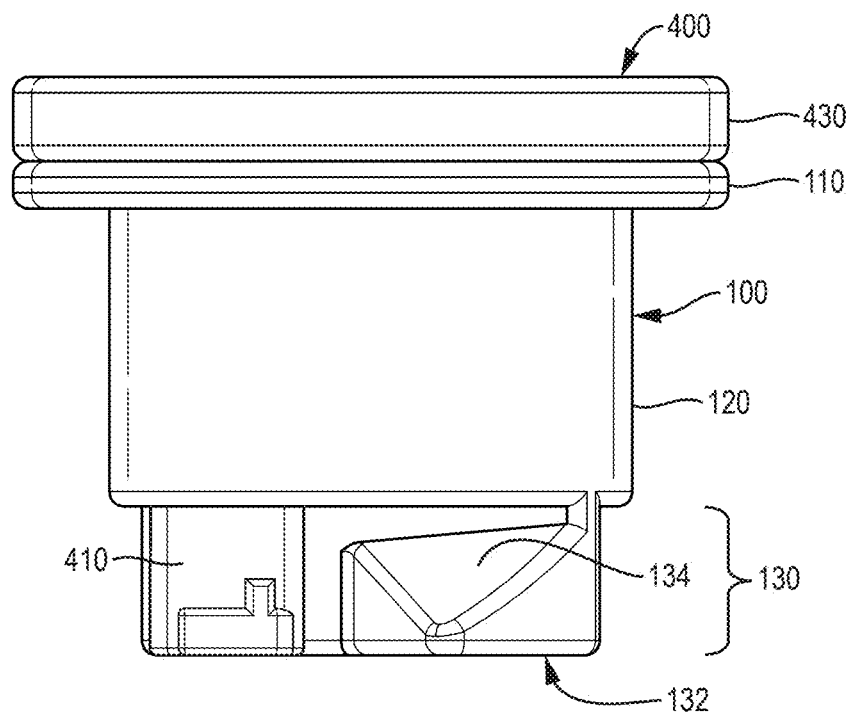

Embodiments of the present invention provide an innovative fastening system that enables secure mechanical connections through a unique combination of rotational engagement and integrated locking functionality. The fastening system creates robust connections without requiring separate hardware components or specialized tools for assembly and disassembly.

At its core, the fastening system comprises a bolt that can be inserted into a receiving hole formed in a surface and rotated to create a secure mechanical connection. The bolt includes a head portion that remains accessible from the exterior, a shaft member that defines the axis of rotation, and a locking member with wings that engage with underside surfaces when the bolt is rotated. This engagement prevents withdrawal of the bolt while maintaining the ability to support additional components between the bolt head and surface.

The system implements a two-stage locking approach that provides exceptional security. In the first stage, rotating the bolt causes its wings to engage with underside surfaces of the receiving hole, preventing withdrawal. In the second stage, a locking mechanism can be inserted through aligned holes that are created when the bolt reaches its rotated position. This locking mechanism prevents the bolt from rotating back to its initial orientation, thereby maintaining the secure engagement of the wings.

The fastening system provides several important advantages over conventional approaches. The system enables tool-free assembly and disassembly, eliminating the need for specialized equipment during installation and removal. It requires no separate hardware components, reducing inventory management challenges and the risk of lost parts. The system incorporates integrated locking functionality that securely prevents both withdrawal and rotation once engaged. The design allows for supporting additional components between the bolt head and surface, enhancing its versatility in various applications. Furthermore, the system offers flexibility in its operation by providing options for either interior or exterior lock removal, accommodating different usage scenarios and accessibility requirements. These combined features create a reliable fastening solution that effectively prevents both withdrawal and rotation while maintaining ease of use. These benefits make the system particularly well-suited for applications requiring secure yet reversible connections, especially in contexts where minimizing loose components and simplifying assembly processes are important considerations.

In embodiments of the fastening system, a bolt 100 may include a head 110, a shaft member 120 defining an axis of rotation 140, and a locking member 130 having a plurality of wings 131, 132. The shaft member 120 may include at least one hole 121, 122 extending through the shaft member along the axis of rotation 140. The holes 121, 122 may be part of a larger opening 126 in the bolt 100.

The fastening system includes a receiving hole 200 formed in a surface 210. The receiving hole 200 may be configured to receive the bolt 100 and enable its rotation from an initial angular orientation to a second angular orientation. When the bolt 100 is in the initial angular orientation, one or more receiving hole nibs 233 on diagonally opposing edges of the receiving hole 200 may exert pressure against sides of the wings 131, 132 of the bolt 100.

A locking mechanism 300, 400 may be insertable into the at least one hole 121, 122 in the shaft member 120 (e.g., through the opening 126) after rotation of the bolt to the second angular orientation. When inserted, the locking mechanism 300, 400 prevents rotation of the bolt 100 relative to the receiving hole 200 and prevents removal of the bolt from the receiving hole.

In operation, embodiments of the fastening system may provide a secure connection through a two-stage process. First, the bolt 100 may be inserted into the receiving hole 200 and rotated to engage the wings 131, 132 with underside surfaces 231, 232 of the receiving hole. Second, the locking mechanism 300, 400 may be inserted through the aligned holes to prevent both rotation and withdrawal of the bolt.

In embodiments of the fastening system, the plurality of wings 131, 132 of the locking member 130 may collectively have a cross section with a particular shape. In some embodiments, this particular shape may be characterized as a "bowtie" or "butterfly" configuration that enables insertion and engagement with the receiving hole 200.

The plurality of wings may include a first wing 131 having a first tooth 133 extending in a first angular direction about the axis of rotation 140, and a second wing 132 having a second tooth 134 extending in the first angular direction about the axis of rotation 140. The first tooth 133 may be angularly spaced from the second tooth 134 about the axis of rotation 140.

In operation, this configuration creates a unique engagement mechanism where both teeth 133, 134 extend in the same rotational direction (e.g., both clockwise or both counterclockwise) about the axis of rotation 140, while appearing to extend in opposite directions when viewed along the axis. This arrangement enables the teeth 133, 134 to effectively engage with the underside surfaces 231, 232 of the receiving hole 200 when the bolt 100 is rotated to its second angular orientation.

The angular spacing between the first tooth 133 and second tooth 134 may be configured to provide balanced engagement with the receiving hole 200 while maintaining the ability to insert and remove the bolt 100 when oriented in its initial angular orientation.

In embodiments of the fastening system, the receiving hole 200 includes an opening 220 having a cross-section with the particular shape, adapted to allow insertion of the bolt 100 via the particular-shaped cross-section in an initial angular orientation. In some embodiments, this opening 220 may have a bowtie or butterfly shape that corresponds to the cross-sectional shape of the wings 131, 132 to enable initial insertion of the bolt 100. Regardless of the particular cross-sectional shape of the wings 131, 132, the opening 220 may have a shape that corresponds to the cross-section shape of the wings 131, 132.

The receiving hole 200 includes underside surfaces 231, 232, wherein upon rotation of the bolt 100 from the initial angular orientation to a second angular orientation, the plurality of wings 131, 132 engage with the underside surfaces to prevent withdrawal of the bolt from the receiving hole 200 while the bolt 100 is in the second angular orientation.

In operation, when the bolt 100 is first inserted through the opening 220, its wings 131, 132 may pass freely through the correspondingly shaped opening. Upon rotation to the second angular orientation, the wings 131, 132 rotate such that their teeth 133, 134 engage with the underside surfaces 231, 232, creating a mechanical interference that prevents withdrawal of the bolt 100 from the receiving hole 200.

The underside surfaces 231, 232 may be arranged to provide secure engagement with the wings 131, 132 while maintaining the ability to rotate the bolt 100 back to its initial angular orientation when the locking mechanism 300, 400 is removed.

In embodiments of the fastening system, the at least one hole in the shaft member 120 may comprise a plurality of holes 121, 122 extending through the shaft member. The locking mechanism 300, 400 may be insertable into the plurality of holes 121, 122.

For example, the shaft member 120 may include two or more holes and a slot that runs along the shaft to accommodate the locking mechanism 300, 400. When the bolt 100 is rotated to its second angular orientation, these holes 121, 122 align with corresponding openings 241, 242 in the surface 210 to create a continuous passthrough for receiving the locking mechanism 300, 400. The two or more holes may consist of exactly two holes.

The plurality of holes 121, 122 may be configured to receive corresponding prongs 310, 320 or 410, 420 of the locking mechanism 300, 400. When inserted through the aligned holes, these prongs create a wedging action that prevents both rotation and withdrawal of the bolt 100.

In embodiments of the fastening system, the particular shape of the cross section of the plurality of wings 131, 132 may comprise a bowtie shape 135. The bowtie shape may be characterized by a central narrow portion that expands outwardly in opposing directions to create wider end portions, similar to the shape of a traditional bowtie.

This bowtie-shaped cross section creates a distinctive profile where the wings 131, 132 collectively form a shape that is wider at its outer portions and narrower in the middle, which may also be characterized as a "butterfly" shape. This configuration enables the bolt 100 to be inserted through a correspondingly shaped opening 220 in the receiving hole 200 when aligned in the initial orientation.

The bowtie shape 135 of the wings' cross section works in conjunction with the matching bowtie-shaped opening 220 of the receiving hole 200 to enable both insertion when aligned and secure engagement when rotated. When the bolt 100 is rotated to its second angular orientation, the wider end portions of the bowtie shape engage with the underside surfaces 231, 232 of the receiving hole 200, preventing withdrawal of the bolt.

In embodiments of the fastening system, the locking mechanism 300 may include a plurality of prongs 310, 320 that are insertable into the plurality of holes 121, 122 in the bolt 100. The plurality of prongs 310, 320 may be removable from the plurality of holes 121, 122 in the bolt 100 by pushing the plurality of prongs from an interior side 212 of the surface 210 back through the plurality of holes in the bolt.

This configuration represents what is referred to herein as a "non-pop" version of the locking mechanism, where the lock may be pushed up (e.g., by hand) from the inside to remove it. When inserted, the prongs 310, 320 may create a wedging action that prevents the bolt 100 from rotating or moving. The prongs 310, 320 may be pushed from the interior side 212 of the surface 210 to disengage the locking mechanism 300, allowing the bolt 100 to be rotated back to its initial orientation for removal.

The plurality of prongs 310, 320 may be configured to create frictional engagement with both the holes 121, 122 in the bolt 100 and corresponding openings 241, 242 in the surface 210. This engagement prevents withdrawal of the locking mechanism 300 in the direction of insertion while maintaining the ability to remove the mechanism by pushing from the interior side 212. One or more nibs 125 may protrude from the inside of the opening 126 to apply pressure to the prongs 310, 320 of the non-pop locking mechanism 300 when they are inserted into the opening 126. The bolt 100 may also include one or more shoulders 127 on the inside of the opening 126. When the non-pop locking mechanism 300 is inserted into the opening 126 of the bolt 100, part of the non-pop locking mechanism 300 may be at rest against the shoulders 127.

In embodiments of the fastening system, the locking mechanism 400 may include a plurality of prongs 410, 420 that are insertable into the plurality of holes 121, 122 in the bolt 100. The locking mechanism 400 includes a pulling member 430 coupled to the plurality of prongs 410, 420. The locking mechanism 400 may be removable from the plurality of holes 121, 122 in the bolt 100 by pulling the pulling member 430 from an exterior side 211 of the surface 210.

This configuration represents a "pop-lock" version where a full plate may be pulled from the outside. When inserted, the prongs 410, 420 may create a wedging action similar to the non-pop version to prevent the bolt 100 from rotating or moving. However, rather than requiring access to the interior side 212, this version allows removal by pulling the pulling member 430 from the exterior side 211 of the surface 210.

The pulling member 430 may be configured as a plate that remains accessible from the exterior side 211 while maintaining secure engagement of the prongs 410, 420 with the holes 121, 122 in the bolt 100 and corresponding openings 241, 242 in the surface 210. The configuration enables removal of the bolt 100 entirely from the exterior by pulling out the locking mechanism, twisting the bolt, and withdrawing it.

In embodiments of the fastening system, upon removing the locking mechanism 300, 400 from the plurality of holes 121, 122 in the bolt 100, the bolt may be rotatable to the first angular orientation. This feature applies to both the non-pop version where the prongs 310, 320 are pushed from the interior side 212, and the pop-lock version where the pulling member 430 is pulled from the exterior side 211.

After the locking mechanism 300, 400 is removed, the bolt 100 may be rotated back to its initial angular orientation where the wings 131, 132 align with the bowtie-shaped opening 220. In this orientation, the wings 131, 132 are no longer engaged with the underside surfaces 231, 232, allowing the bolt 100 to be withdrawn from the receiving hole 200.

The ability to rotate the bolt 100 back to its initial orientation after lock removal enables complete disassembly of the fastening system when desired. This reversible locking functionality may be achieved regardless of whether the locking mechanism 300, 400 is removed by pushing from the interior side 212 or pulling from the exterior side 211.

In embodiments of the fastening system, the shaft member 120 may be cylindrical. The cylindrical configuration represents one possible cross-sectional shape for the shaft member 120, while other embodiments may utilize different cross-sectional profiles.

For example, in some embodiments, the shaft member 120 may have a rounded rectangle cross-sectional shape with two curved sides opposite each other and two flat sides opposite each other. The flat sides may prevent rotation of the shaft member 120 when inserted into a rectangular opening, while the curved sides may enable coupling or hanging of curved objects. This dual-surface configuration provides both rotational stability and versatile attachment capabilities.

The shaft member 120 may be configured with various cross-sectional shapes while maintaining its core functionality of defining an axis of rotation 140 and accommodating the plurality of holes 121, 122 that receive the locking mechanism 300, 400. The specific cross-sectional shape may be selected based on the intended application and mounting requirements.

In embodiments of the fastening system, the underside surfaces 231, 232 of the receiving hole 200 may be disposed along an axis that aligns with an axis of the bowtie-shaped cross section 135 of the two wings 131, 132 when the bolt 100 is in the second angular orientation.

This alignment creates an optimal engagement configuration where the wings 131, 132 and their respective teeth 133, 134 properly interface with the underside surfaces 231, 232 after rotation. When the bolt 100 is rotated to its second angular orientation, the axis of the bowtie-shaped cross section 135 becomes aligned with the axis along which the underside surfaces 231, 232 are disposed, enabling secure mechanical interference that prevents withdrawal of the bolt.

The alignment of these axes in the second angular orientation may contribute to the overall stability and security of the connection by ensuring proper positioning of the wings 131, 132 relative to the underside surfaces 231, 232. This aligned configuration helps maintain consistent engagement between the wings and underside surfaces while the locking mechanism 300, 400 prevents rotation back to the initial angular orientation.

In embodiments of the fastening system, when the bolt 100 is in the initial angular orientation, the plurality of holes 121, 122 in the shaft member 120 may not be aligned with any opening through the surface 210. When the bolt 100 is rotated to the second angular orientation, the plurality of holes 121, 122 in the shaft member 120 may align with corresponding openings 241, 242 in the surface 210 to create a continuous passthrough for receiving the locking mechanism 300, 400.

This alignment feature enables proper insertion of the locking mechanism 300, 400 only after the bolt 100 has been rotated to its second angular orientation where the wings 131, 132 are engaged with the underside surfaces 231, 232. The continuous passthrough created by the alignment of the holes 121, 122 with the corresponding openings 241, 242 allows the prongs 310, 320 or 410, 420 of the locking mechanism to be fully inserted through both the bolt 100 and surface 210.

The initial non-alignment of the holes helps ensure proper sequential operation of the fastening system-first requiring rotation of the bolt 100 to engage the wings 131, 132 with the underside surfaces 231, 232, and only then allowing insertion of the locking mechanism 300, 400 through the newly aligned passthrough to secure the engagement.

In embodiments of the fastening system, the locking mechanism 300, 400 may comprise a plurality of prongs 310, 320 or 410, 420. When the locking mechanism is inserted into the plurality of holes 121, 122 in the shaft member 120, multiple frictional engagements may be created to secure the assembly.

Specifically, the plurality of prongs 310, 320 or 410, 420 may create frictional engagement with inner surfaces of the receiving hole 200. The plurality of prongs may also create frictional engagement with side surfaces of the wings 131, 132. Additionally, the first and second wings 131, 132 may create frictional engagement with additional inner surfaces of the receiving hole 200.

This multi-point frictional engagement serves two key purposes. First, the frictional engagement prevents withdrawal of the locking mechanism 300, 400 in a direction of insertion. The wedging action created by the prongs 310, 320 or 410, 420 against both the receiving hole surfaces and wing surfaces helps maintain the locking mechanism in its inserted position.

Second, the positioning of the pins prevents rotation of the bolt 100 from the second angular orientation to the initial angular orientation. By creating frictional interference at multiple contact points, the locking mechanism 300, 400 effectively locks the bolt 100 in its engaged position where the wings 131, 132 are secured against the underside surfaces 231, 232 of the receiving hole 200.

In embodiments of the fastening system, the head 110 may have a width greater than a width of the shaft member 120. When the bolt 100 is locked into the surface 210 via the locking mechanism 300, 400, a portion of the shaft member 120 may extend from an exterior side 211 of the surface to an inner surface of the head 110. The portion of the shaft member 120 may be configured to support an object 500 between the exterior side 211 of the surface and the inner surface of the head 110.

This configuration enables the fastening system to serve both connection and support functions. The wider head 110 creates a ledge or shoulder that extends beyond the width of the shaft member 120, while the exposed portion of the shaft member between the surface 210 and head 110 provides a support region. Objects 500 may be mounted on or supported by this exposed shaft portion, with the wider head 110 preventing the supported objects from sliding off the top of the bolt 100.

The ability to support objects 500 on the exposed portion of the shaft member 120 enhances the versatility of the fastening system. The shaft member 120 may maintain its ability to support objects while the wings 131, 132 remain securely engaged with the underside surfaces 231, 232 and the locking mechanism 300, 400 prevents rotation of the bolt 100.

In embodiments of the fastening system, the alignment of holes 121, 122 with corresponding openings 241, 242 may work in conjunction with the multi-point friction locking to create a secure connection. When the bolt 100 is rotated to its second angular orientation, the plurality of holes 121, 122 in the shaft member 120 align with the corresponding openings 241, 242 in the surface 210 to create a precisely positioned continuous passthrough.

This aligned passthrough may guide the prongs 310, 320 or 410, 420 of the locking mechanism 300, 400 into optimal position for creating multiple frictional engagement points. Specifically, the alignment enables the prongs to simultaneously engage with inner surfaces of the receiving hole 200, side surfaces of the wings 131, 132, and positions the wings for engagement with additional inner surfaces of the receiving hole.

The precise alignment of the holes and openings helps ensure proper positioning of the prongs 310, 320 or 410, 420 to create effective wedging action through multiple frictional contact points. This coordinated engagement between the aligned passthrough and the multi-point friction locking may contribute to preventing both withdrawal of the locking mechanism 300, 400 and rotation of the bolt 100 back to its initial orientation.

The continuous passthrough created by the aligned holes may guide the prongs 310, 320 or 410, 420 along a path that optimizes their contact angles with both the receiving hole surfaces and wing surfaces, enhancing the overall security of the frictional engagement. This guided insertion helps ensure consistent and reliable locking performance across both the standard and pop-lock versions of the locking mechanism.

In embodiments of the fastening system, the bowtie-shaped cross section 135 of the wings 131, 132 may interact with the underside surfaces 231, 232 through a specific geometric relationship. The underside surfaces 231, 232 of the receiving hole 200 may be disposed along an axis that aligns with an axis of the bowtie-shaped cross section 135 when the bolt 100 reaches its second angular orientation.

This geometric relationship enables two distinct phases of operation. In the initial insertion phase, the bowtie shape 135 aligns with the correspondingly shaped opening 220 to allow the wings 131, 132 to pass freely through the receiving hole 200. During the subsequent rotation phase, the axis of the bowtie-shaped cross section 135 rotates until it aligns with the axis along which the underside surfaces 231, 232 are disposed.

The alignment of these axes in the second angular orientation may be crucial for creating proper mechanical interference between the wings 131, 132 and the underside surfaces 231, 232. When the axes align, the wings' teeth 133, 134 may engage optimally with the underside surfaces 231, 232 to prevent withdrawal of the bolt 100. This precise geometric relationship helps ensure consistent engagement and secure locking while maintaining the ability to disengage when the bolt 100 is returned to its initial orientation.

In embodiments of the fastening system, the shaft member 120 may be configured with different cross-sectional profiles that enable various object mounting capabilities while maintaining the core locking functionality. The shaft member 120 may be cylindrical or may have an obround cross-section with two curved sides opposite each other and two flat sides opposite each other.

When the bolt 100 is locked into the surface 210, the portion of the shaft member 120 that extends from the exterior side 211 to the inner surface of the head 110 may support different types of objects 500 depending on its cross-sectional profile. A cylindrical shaft member 120 may enable supported objects 500 to rotate freely around the shaft, while maintaining the wider head 110 that prevents the objects from sliding off the top of the bolt 100.

In embodiments with an obround shaft member 120, the flat sides may prevent rotation of supported objects 500 that have corresponding flat surfaces, while the curved sides may accommodate objects with curved mounting features. This dual-surface configuration enables both rotational constraint and versatile attachment capabilities while preserving the shaft member's ability to accommodate the plurality of holes 121, 122 for the locking mechanism 300, 400.

The different shaft profiles may be selected based on the intended mounting application, while maintaining the core functionality of defining the axis of rotation 140 and supporting the wings 131, 132 and locking member 130. Regardless of the shaft profile chosen, the wider head 110 continues to provide support for objects 500 mounted on the exposed portion of the shaft member 120.

In embodiments of the fastening system, the plurality of holes 121, 122 in the shaft member 120 may be configured to accommodate both variants of the locking mechanism 300, 400. The holes 121, 122 may be sized and positioned to enable insertion and removal of both the standard prongs 310, 320 that are pushed from the interior side 212 and the pop-lock prongs 410, 420 that are pulled from the exterior side 211.

When the bolt 100 is rotated to its second angular orientation, the plurality of holes 121, 122 align with corresponding openings 241, 242 to create a continuous passthrough suitable for either locking mechanism variant. This aligned configuration may accommodate both the standard prongs 310, 320 that engage when pushed inward and the pop-lock prongs 410, 420 coupled to the pulling member 430 that engage when inserted from the exterior.

The holes 121, 122 may be configured to maintain proper frictional engagement regardless of which locking mechanism variant is used. When the standard prongs 310, 320 are inserted, they may create frictional contact with the hole surfaces to prevent withdrawal in the insertion direction while enabling removal by pushing from the interior side 212. Similarly, when the pop-lock prongs 410, 420 are inserted, they may establish comparable frictional engagement while being removable by pulling the pulling member 430 from the exterior side 211.

This dual compatibility of the hole configuration enables the fastening system to accommodate either locking mechanism variant while maintaining secure engagement through the multi-point friction locking arrangement. The holes 121, 122 may be precisely sized and shaped to ensure optimal frictional contact with either set of prongs while preserving the ability to remove the chosen locking mechanism in its intended manner.

In embodiments of the fastening system, the wings 131, 132 may be configured with geometry that enables both secure engagement when rotated and free passage when returned to the initial orientation. The wings 131, 132 and their respective teeth 133, 134 may be shaped to pass freely through the bowtie-shaped opening 220 when aligned in the initial orientation, while providing robust mechanical interference with the underside surfaces 231, 232 when rotated to the second angular orientation.

This dual functionality requires precise coordination between multiple geometric features. The bowtie-shaped cross section 135 of the wings 131, 132 may correspond to the shape of the opening 220 to enable initial insertion, while the teeth 133, 134 may be configured to engage securely with the underside surfaces 231, 232 upon rotation. When the locking mechanism 300, 400 is removed, this precise geometry allows the wings 131, 132 to disengage cleanly from the underside surfaces 231, 232 as the bolt 100 is rotated back to its initial orientation.

The reversible engagement may be achieved through careful design of the wing geometry in relation to both the receiving hole 200 geometry and the locking mechanism operation. When the locking mechanism 300, 400 is removed, the wings 131, 132 may rotate freely within the receiving hole 200 until they align with the bowtie-shaped opening 220, at which point the bolt 100 may be withdrawn. This coordinated interaction between the wings, receiving hole geometry, and removable locking mechanism enables the fastening system to transition securely between locked and unlocked states.

In embodiments of the fastening system, a bolt 100 may include a cylindrical shaft member 120 defining an axis of rotation 140. The shaft member 120 includes exactly two holes 121, 122 extending through the shaft member along the axis of rotation 140. A head 110 extends from one end of the shaft member 120, while a locking member 130 with exactly two wings 131, 132 extends from the opposite end.

The two wings 131, 132 collectively form a bowtie-shaped cross section 135. The first wing 131 includes a first tooth 133 extending in a first angular direction about the axis of rotation 140, while the second wing 132 includes a second tooth 134 extending in the same angular direction but angularly spaced from the first tooth about the axis.

A receiving hole 200 formed in a surface 210 includes a bowtie-shaped opening 220 that corresponds to the cross-sectional shape of the wings 131, 132. This opening 220 allows insertion of the bolt 100 in an initial angular orientation. The receiving hole 200 includes underside surfaces 231, 232 disposed along an axis that aligns with an axis of the bowtie-shaped cross section 135 when the bolt 100 is rotated to a second angular orientation.

When the bolt 100 is in its initial orientation, the two holes 121, 122 in the shaft member 120 are not aligned with any opening through the surface 210. However, when the bolt 100 is rotated to its second orientation, these holes 121, 122 align with corresponding openings 241, 242 in the surface 210 to create a continuous passthrough.

A locking mechanism 300, 400 comprising a plurality of prongs 310, 320 or 410, 420 may be inserted into the aligned holes to create multiple frictional engagements:

Between the prongs and inner surfaces of the receiving hole 200.

Between the prongs and side surfaces of the wings 131, 132.

Between the wings 131, 132 and additional inner surfaces of the receiving hole 200

This frictional engagement prevents withdrawal of the locking mechanism 300, 400 in its insertion direction, while the positioning of the prongs prevents rotation of the bolt 100 back to its initial orientation. When the locking mechanism 300, 400 is removed, the bolt 100 may be rotated back to its initial orientation for removal.

Figure 8A:
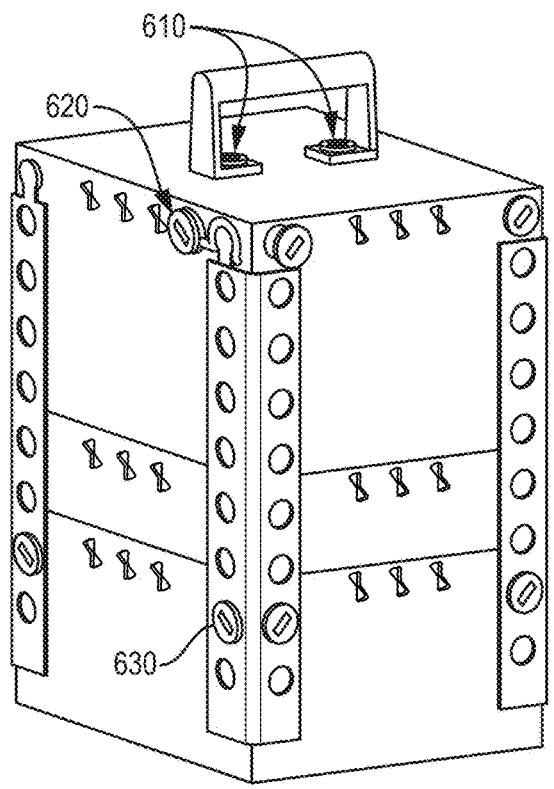
FIGS. 8A-8B show the use of fastening members to mount various objects according to embodiments of the present invention.
Figure 8B:
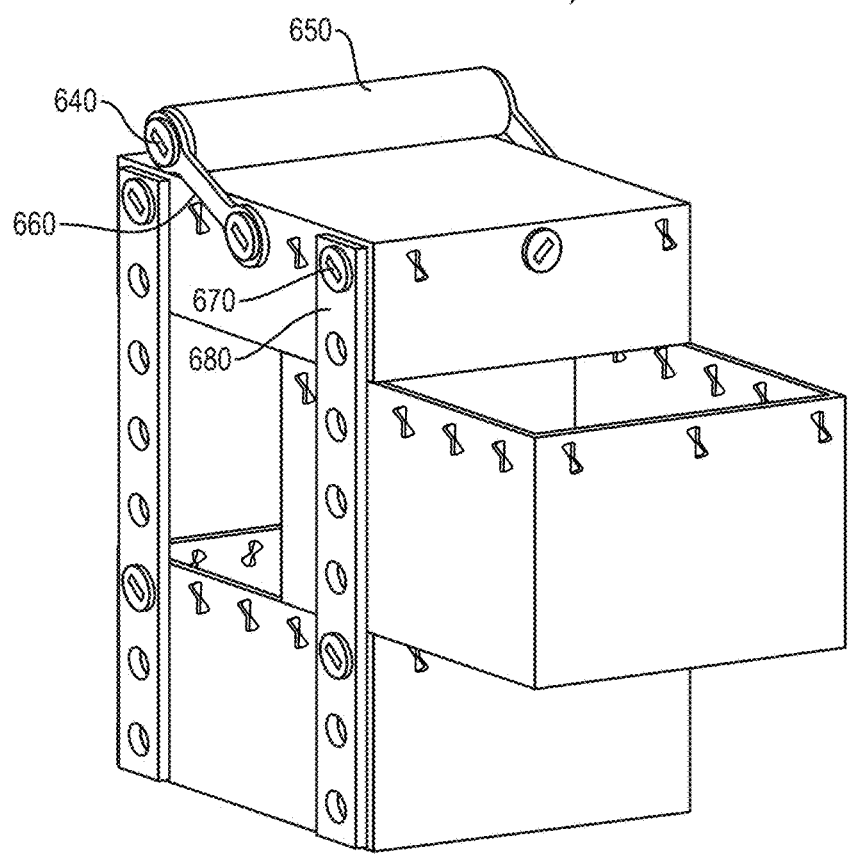

Various embodiments of the fastening system disclosed herein may be used to mount objects onto other objects, examples of which are shown in FIGS. 8A and 8B. More specifically, FIG. 8A shows a first embodiment of a container 600a in which a bolt 620 secures a lid to the container 600a using a hook. Furthermore, in the container 600a of FIG. 8A, a plurality of bolts 610 secure a handle to the lid of the container 600a. In addition, in the container 600a of FIG. 8A, bolts 630 secure cages to the container 600a.

FIG. 8B shows a second embodiment of a container 600b in which bolts 640 secure a handle 650 to a plurality of arms 660. In addition, in the container 600b of FIG. 8B, bolts 670 secure boxes together with side connectors 680.

In embodiments of the fastening system, the bolt 100 may be implemented in various configurations while maintaining its core functionality of providing a secure mechanical connection. The specific examples described herein represent illustrative implementations, and other configurations may be utilized while remaining within the scope of the present disclosure.

The bolt 100 may be manufactured from any suitable materials and may be scaled to different sizes based on the intended application. The specific dimensions, proportions, and scale of the bolt components may be varied while preserving the functional relationships that enable secure engagement and locking.

While particular geometries and configurations are described in detail herein, embodiments of the bolt 100 may utilize different shapes, profiles, and arrangements of components that achieve similar functional results. The specific angular relationships, rotational ranges, and engagement geometries may be modified while maintaining the bolt's ability to transition between freely insertable and securely locked states.

The number, arrangement, and configuration of components may be varied in different embodiments. For example, while specific numbers of wings, teeth, and holes are described in particular embodiments, other quantities and arrangements may be implemented while preserving the core functionality of rotational engagement and secure locking.

Embodiments may incorporate additional features or modifications to enhance performance in specific applications, such as weather resistance, enhanced grip surfaces, or specialized coatings, while maintaining the fundamental operational principles of the fastening system.

In embodiments of the fastening system, the head 110 may be implemented with various configurations while maintaining its core function of preventing supported objects 500 from sliding off the bolt 100. While specific examples describe a head having a width greater than the shaft member, the head may be implemented with different relative size ratios based on the intended application and load requirements.

The head 110 may incorporate different shapes and profiles beyond the examples described herein. For example, the head may be circular, rectangular, hexagonal, or other polygonal shapes. The head may include various surface features such as texturing, knurling, or grip patterns to facilitate manual rotation of the bolt 100. The inner surface of the head that interfaces with supported objects may be flat, curved, stepped, or otherwise contoured to accommodate different object mounting requirements.

The head 110 may also include additional functional features while maintaining its primary purpose of object retention. Such features may include decorative elements, identification markings, or structural elements that enhance the head's interaction with supported objects 500 or facilitate bolt manipulation. The specific thickness, profile, and edge characteristics of the head may be varied to suit different applications while preserving the fundamental relationship between the head width and shaft width that enables object support.

The transition geometry between the head 110 and shaft member 120 may be implemented in different ways, such as with fillets, chamfers, or other transitional features, while maintaining proper clearance for supported objects. The head may also incorporate different materials or material combinations to provide specific performance characteristics such as wear resistance or reduced friction against supported objects.

In embodiments of the fastening system, the shaft member 120 may be implemented with various cross-sectional profiles while maintaining its core functions of defining an axis of rotation and accommodating the locking mechanism. While specific examples describe cylindrical and obround configurations, the shaft member may utilize other cross-sectional shapes such as oval, polygonal, or compound curved profiles that enable appropriate rotation and locking functionality.

The holes 121, 122 extending through the shaft member 120 may be implemented with different configurations while preserving their ability to create a continuous passthrough when aligned. The number, size, shape, and arrangement of holes may be varied based on specific application requirements, though embodiments with exactly two holes provide an effective balance of security and simplicity. The holes may incorporate various surface features or geometries that enhance engagement with the locking mechanism 300, 400 while maintaining proper alignment capability.

The shaft member 120 may be manufactured from any suitable materials that provide appropriate structural integrity and durability for the intended application. Different materials or material combinations may be selected to achieve specific performance characteristics such as strength, wear resistance, or reduced friction. The shaft member may also incorporate surface treatments or coatings while maintaining proper functionality of the holes and interface with the wings.

The length and diameter proportions of the shaft member 120 may be scaled for different applications while maintaining proper spacing between the head 110 and surface 210 for supporting objects 500. The transition geometry between the shaft member and both the head and wings may be implemented with various features such as fillets, chamfers, or other profiles that enhance manufacturability or performance while preserving core functionality.

In embodiments of the fastening system, the locking member 130 may be implemented with various configurations while maintaining its core function of providing secure engagement upon rotation. While specific examples describe a locking member having exactly two wings, embodiments may utilize different numbers and arrangements of wings that collectively create an insertable and lockable geometry.

The cross-sectional shape of the plurality of wings may vary beyond the bowtie shape described in specific examples. The wings may collectively form other insertable profiles that enable both initial passage through a correspondingly shaped opening and subsequent rotational engagement. The specific geometry of the cross-section may be modified while preserving the fundamental ability to pass through the opening in one orientation and engage securely in another.

The teeth extending from the wings may be implemented with different profiles, sizes, and engagement geometries while maintaining their core function of preventing withdrawal when rotated. While specific examples describe teeth extending in the same angular direction and being angularly spaced, other tooth configurations may be utilized that achieve secure engagement upon rotation. The specific angular spacing between teeth may be varied based on application requirements while preserving proper engagement functionality.

The transition geometry between the wings and shaft member may incorporate various features such as fillets, chamfers, or other profiles that enhance manufacturability or structural integrity. The wings may be manufactured from suitable materials selected for specific performance characteristics such as strength, wear resistance, or reduced friction, while maintaining proper engagement functionality with the receiving hole.

The cross-sectional shape of the plurality of wings may vary beyond the bowtie shape described in specific examples. The wings may collectively form other insertable profiles that enable both initial passage through a correspondingly shaped opening and subsequent rotational engagement. The specific geometry of the cross-section may be modified while preserving the fundamental ability to pass through the opening in one orientation and engage securely in another.

The teeth extending from the wings may be implemented with different profiles, sizes, and engagement geometries while maintaining their core function of preventing withdrawal when rotated. While specific examples describe teeth extending in the same angular direction and being angularly spaced, other tooth configurations may be utilized that achieve secure engagement upon rotation. The specific angular spacing between teeth may be varied based on application requirements while preserving proper engagement functionality.

The transition geometry between the wings and shaft member may incorporate various features such as fillets, chamfers, or other profiles that enhance manufacturability or structural integrity. The wings may be manufactured from suitable materials selected for specific performance characteristics such as strength, wear resistance, or reduced friction, while maintaining proper engagement functionality with the receiving hole.

In embodiments of the fastening system, the opening 220 of the receiving hole 200 may be implemented with various configurations while maintaining its core function of allowing insertion of the bolt 100 in an initial angular orientation. While specific examples describe a bowtie-shaped opening, the particular shape of the cross-section may include other geometries that enable both initial insertion and subsequent rotational engagement.

The opening 220 may be scaled to different sizes while maintaining proper clearance ratios with the bolt's cross-sectional shape. The specific proportions and tolerances between the opening and bolt cross-section may be optimized for different applications while preserving smooth insertion capability.

The transition geometry around the opening 220 may incorporate various features such as chamfers, rounds, or guide surfaces that facilitate proper alignment and insertion of the bolt 100. The opening may include additional alignment features or markings that help indicate the proper initial orientation while maintaining the fundamental ability to receive the particularly-shaped cross-section of the bolt.

The shape of the opening 220 may be modified to accommodate different wing configurations while preserving the basic principle of allowing insertion in one orientation and preventing withdrawal in another. The specific angular relationship between the opening shape and the initial insertion orientation may be varied while maintaining proper functionality with the bolt's rotational engagement system.

In embodiments of the fastening system, the underside surfaces 231, 232 of the receiving hole 200 may be implemented with various configurations while maintaining their core function of preventing withdrawal when engaged with the rotated wings 131, 132. While specific examples describe particular underside surface geometries, different profiles and arrangements may be utilized that enable secure engagement upon rotation of the bolt 100.

The specific angular displacement between the initial and second angular orientations may vary in different embodiments while preserving proper engagement functionality. The rotation required to transition from insertion to engagement may be optimized for different applications while maintaining secure locking capability.

The engagement surfaces may incorporate various features such as angled faces, steps, or curved profiles that interface with the wing teeth 133, 134 while preventing withdrawal. The specific geometry of the engagement between the wings 131, 132 and underside surfaces 231, 232 may be modified while preserving the fundamental principle of mechanical interference in the second angular orientation.

The underside surfaces 231, 232 may be formed with different materials, surface treatments, or coatings that enhance engagement properties while maintaining proper function. The specific positioning and orientation of the underside surfaces relative to the receiving hole opening 220 may be varied while preserving proper engagement mechanics during rotation from the initial to second angular orientation.

The engagement between the wings 131, 132 and underside surfaces 231, 232 may be configured to provide different degrees of resistance to withdrawal based on application requirements, while maintaining secure retention when the bolt 100 is in the second angular orientation. The specific interaction between the wing teeth and engagement surfaces may incorporate various mechanical interference principles while preserving the core functionality of preventing withdrawal after rotation.

In embodiments of the fastening system, the locking mechanism 300, 400 may be implemented with various configurations while maintaining its core functions of preventing bolt rotation and removal after insertion. While specific examples describe standard push-from-inside and pop-lock pull-from-outside variants, other locking mechanism designs may be utilized that achieve secure retention of the bolt 100 in its engaged position.

The locking mechanism 300, 400 may incorporate different numbers, sizes, and arrangements of prongs while preserving proper engagement with the holes in the shaft member 120. The specific geometry and profile of the prongs may be modified while maintaining their ability to create effective frictional engagement with the bolt holes and receiving hole surfaces.

The means for inserting and removing the locking mechanism may vary beyond the specific push and pull examples described. Different actuation methods may be implemented while preserving the fundamental ability to insert the mechanism after bolt rotation and remove it when disengagement is desired. The specific interface between the locking mechanism and the aligned holes may incorporate various engagement features while maintaining proper securing functionality.

The materials and manufacturing methods used for the locking mechanism may be selected based on specific application requirements while preserving proper engagement properties. The mechanism may incorporate additional features such as retention elements, alignment guides, or ergonomic improvements while maintaining its core functions of preventing both rotation and withdrawal of the engaged bolt.

The frictional and mechanical interference characteristics between the locking mechanism and engaged surfaces may be optimized for different applications while preserving secure retention. The specific positioning and orientation of engagement surfaces may be varied while maintaining the fundamental ability to prevent bolt rotation and removal when the mechanism is inserted.

Embodiments of the invention have a variety of advantages, including one or more of the following.

Embodiments of the fastening system may provide significant advantages for tool-free assembly and operation. The bolt 100 may be inserted and rotated by hand to create secure mechanical connections, eliminating any need for specialized installation tools. The system may enable quick assembly through simple insertion of the bolt 100 through the receiving hole 200 and rotation to engage the wings 131, 132 with the underside surfaces 231, 232.

The locking mechanism 300, 400 may also be inserted and removed without tools, allowing for easy transitioning between locked and unlocked states. For standard versions, the locking mechanism may be pushed out from the interior side 212, while pop-lock versions may be removed by pulling from the exterior side 211, all without requiring any specialized removal tools.

The tool-free operation may extend to the disassembly process, where removal of the locking mechanism 300, 400 allows the bolt 100 to be rotated back to its initial orientation and withdrawn by hand. This enables quick and simple reconfiguration or adjustment of assemblies created using embodiments of the fastening system.

The ability to perform all assembly and disassembly operations by hand may be particularly advantageous in applications requiring frequent reconfiguration or temporary connections. Embodiments may maintain secure engagement while preserving the ability to easily modify or disassemble the connection without specialized tools when desired.

Embodiments of the fastening system may provide significant advantages by eliminating the need for separate hardware components. The bolt 100, receiving hole 200, and locking mechanism 300, 400 may form a complete fastening solution without requiring additional parts such as screws, nuts, or other separate fasteners. This integrated approach enables secure mechanical connections using only the components that are formed as part of the system itself.

The self-contained nature of embodiments may reduce logistics and inventory management challenges associated with maintaining stocks of separate hardware components. By incorporating all necessary fastening elements into the integrated system, embodiments may eliminate concerns about matching correct sizes and types of separate fasteners or maintaining inventories of loose hardware.

The elimination of separate components may be particularly advantageous in modular storage applications, where embodiments enable assembly of custom configurations without the need to track or manage additional hardware pieces. This may significantly reduce the risk of lost parts while simplifying the assembly process. The integrated nature of the system may ensure all necessary fastening components remain together as a unified solution.

Embodiments may maintain secure and reliable connections while achieving these advantages through the coordinated functionality of the integrated components rather than relying on separate fastening hardware. The wings 131, 132, underside surfaces 231, 232, and locking mechanism 300, 400 may work together to create robust mechanical interference and frictional engagement without requiring additional securing elements.

Embodiments of the fastening system may provide significant advantages through an integrated dual-stage security approach. In a first security stage, the wings 131, 132 of the bolt 100 may engage with underside surfaces 231, 232 of the receiving hole 200 upon rotation from the initial orientation to the second angular orientation. This rotational engagement may create mechanical interference that prevents withdrawal of the bolt while maintaining the engaged position.

In a second security stage, the locking mechanism 300, 400 may be inserted through the aligned holes 121, 122 in the shaft member 120 and corresponding openings 241, 242 in the surface 210. When inserted, the locking mechanism may prevent both rotation of the bolt 100 back to its initial orientation and withdrawal of the bolt from the receiving hole 200. This dual prevention of both rotation and removal may provide robust security through multiple points of mechanical interference.

The coordinated operation of these two security stages may be particularly advantageous, as the wings 131, 132 must remain properly engaged with the underside surfaces 231, 232 to prevent withdrawal, while the locking mechanism 300, 400 ensures this engagement is maintained by preventing rotation. The multiple points of frictional engagement created by the locking mechanism's prongs with both the receiving hole surfaces and wing surfaces may further enhance the security of the connection.

This dual-stage approach may enable embodiments to maintain secure connections while preserving the ability to intentionally disengage the fastening system when desired. Removal of the locking mechanism 300, 400 may allow controlled rotation of the bolt 100 back to its initial orientation, where the wings 131, 132 may then pass freely through the receiving hole opening 220.

Embodiments of the fastening system may provide significant advantages through versatile locking options that accommodate different installation requirements. The standard version of the locking mechanism 300 may include prongs 310, 320 that are removable by pushing from the interior side 212 of the surface 210 back through the holes in the bolt 100. This configuration may be advantageous in applications where interior access is readily available.

The pop-lock version of the locking mechanism 400 may include prongs 410, 420 coupled to a pulling member 430 that enables removal from the exterior side 211 of the surface 210. This configuration may be particularly advantageous in applications where access to the interior side is limited or where exterior-only operation is preferred.

Both versions of the locking mechanism may maintain equivalent security through similar mechanical principles. When inserted, the prongs of either version may create frictional engagement with inner surfaces of the receiving hole 200, side surfaces of the wings 131, 132, and position the wings for engagement with additional inner surfaces. This multi-point frictional engagement may prevent both rotation and withdrawal regardless of which locking mechanism variant is employed.

The availability of both interior-removal and exterior-removal options may provide installation flexibility while maintaining consistent security performance. This flexibility may be particularly advantageous in modular storage applications, where different access requirements may exist for different components or configurations. Embodiments may enable selection of the most appropriate locking mechanism variant based on specific installation and access requirements.

Embodiments of the fastening system may provide significant advantages through object support capabilities. When the bolt 100 is locked into the surface 210 via the locking mechanism 300, 400, a portion of the shaft member 120 may extend from the exterior side 211 of the surface to an inner surface of the head 110. This exposed portion of the shaft member 120 may be configured to support objects 500 between the exterior side 211 of the surface and the inner surface of the head 110.

The head 110 may have a width greater than the width of the shaft member 120, creating a wider surface that prevents supported objects 500 from sliding off the top of the bolt 100. This wider head configuration may enable secure support of objects while maintaining the bolt's core fastening functionality.

The dual functionality as both fastener and support structure may be particularly advantageous in modular storage applications. The ability to both secure components and support objects using the same fastening system may reduce the need for separate support hardware while maintaining secure mechanical connections. The shaft member 120 may support objects 500 while the wings 131, 132 remain securely engaged with the underside surfaces 231, 232 and the locking mechanism 300, 400 prevents rotation.

Different shaft member 120 profiles may enable various object mounting capabilities. For example, a cylindrical shaft member may allow supported objects to rotate freely, while an obround shaft profile with flat sides may prevent rotation of supported objects that have corresponding flat surfaces. This versatility in supporting different types of objects may be achieved while maintaining the core fastening and locking functionality of the system.

Embodiments of the fastening system may provide significant advantages through compatibility with modular design approaches. The fastening system may be particularly well-suited for creating customizable storage configurations, as the bolt 100 and receiving hole 200 may be incorporated into various surfaces to enable secure but reconfigurable connections. The system may support assembly of modular storage units that can be combined and arranged according to specific storage needs.

The fastening system may enable assembly of diverse storage solutions including card holders, paint holders, miniature holders, dice towers, drawers, trays and other specialized compartments. The ability to securely connect and disconnect components may allow storage configurations to be modified and expanded over time. Embodiments may support both temporary and semi-permanent connections while maintaining consistent security through the dual-stage locking approach.

The system's adaptability to different mounting scenarios may be particularly advantageous in modular applications. The receiving hole 200 may be formed in surfaces that are oriented vertically, horizontally, or at various angles while maintaining proper engagement functionality. This mounting flexibility may enable creation of complex storage arrangements using combinations of differently oriented connection points.

The fastening system may accommodate various storage applications through its ability to both connect components and support objects 500. The combination of secure mechanical connection and object support capabilities may enable versatile storage solutions that can be customized based on specific items being stored. The system may maintain consistent functionality whether used in small individual storage units or larger modular assemblies.

Embodiments of the fastening system may provide significant advantages through reliable security features that prevent unintended disengagement. When inserted, the locking mechanism 300, 400 may create multiple points of frictional engagement-between the prongs and inner surfaces of the receiving hole 200, between the prongs and side surfaces of the wings 131, 132, and between the wings and additional inner surfaces of the receiving hole. This multipoint frictional engagement may prevent both withdrawal of the locking mechanism and rotation of the bolt 100 back to its initial orientation.

The security features may incorporate coordinated geometric relationships that work together to ensure reliable locking. The alignment of the holes 121, 122 with corresponding openings 241, 242 may enable precise positioning of the locking mechanism 300, 400 to create optimal frictional contact. The underside surfaces 231, 232 may be disposed along an axis that aligns with the wings' bowtie-shaped cross section 135 when rotated, enabling secure mechanical interference while preserving the ability to disengage when desired.

The system may maintain security while enabling intentional removal through its dual-stage approach. The wings 131, 132 may remain securely engaged with the underside surfaces 231, 232 until the locking mechanism 300, 400 is intentionally removed, allowing the bolt 100 to be rotated back to its initial orientation. This controlled reversibility may be achieved while maintaining robust security through multiple frictional engagement points when in the locked position.

The frictional and mechanical interference characteristics between components may work together to prevent unintended loosening during use. The specific positioning and orientation of engagement surfaces may create reliable security through coordinated geometric features, while preserving the ability to intentionally remove the fastener when reconfiguration is desired.

In embodiments of the fastening system, components including the bolt 100, receiving hole 200, and locking mechanism 300, 400 may be manufactured through 3D printing processes. The system may be optimized for efficient, support-free 3D printing while maintaining proper functionality of all components. Additionally, the fastening system may also be manufactured using other methods such as injection molding, CNC machining, and various other means of reproduction. The versatility in manufacturing processes provides flexibility in material choices as well. The fastening system can be made out of any of a variety of materials, including but not limited to metal, wood, and plastic.

The ability to 3D print components may provide several advantages. Embodiments may be manufactured without requiring external hardware or adhesives for assembly, leveraging the capabilities of 3D printing to create complete, functional components. The system may be optimized to print efficiently while ensuring proper operation of features like the wings 131, 132, holes 121, 122, and locking mechanisms 300, 400.

The fastening system may be particularly well-suited for 3D printing applications due to its integrated design approach that eliminates separate hardware components. The geometric features that enable insertion, rotation, and locking may be manufactured through additive processes while maintaining proper tolerances and engagement surfaces.

Embodiments may be scaled and customized through 3D printing to meet specific application requirements. The ability to modify dimensions and features through digital manufacturing may enable optimization of the fastening system for different use cases while maintaining core functionality. Components may be printed using various materials and printer settings while preserving proper mechanical operation.

The system may be designed to print efficiently on common 3D printer platforms while minimizing the need for support structures. Print orientation and geometry may be optimized to ensure proper manufacturing of critical features like the wings 131, 132 and holes 121, 122 that enable secure engagement.

The embodiments described herein are provided by way of example to illustrate various aspects of the fastening system. The specific configurations, dimensions, materials, and arrangements discussed represent illustrative implementations, and other variations may be utilized while remaining within the scope of the present disclosure.

While specific examples of components, features, and configurations are described in detail, these descriptions are not intended to be limiting. Rather, they serve to enable those skilled in the art to practice embodiments of the fastening system. Various modifications and alterations may be made to the described embodiments without departing from the spirit and scope of the disclosure.

Features described in connection with one embodiment may be used in other embodiments, even if not explicitly described in connection with those embodiments. The absence of a specific description of a feature in connection with a particular embodiment should not be construed as limiting that embodiment to configurations lacking that feature.

Unless explicitly stated otherwise, the sequential description of elements or steps should not be construed as requiring those elements or steps to be performed in the exact order described. Various modifications to the sequence of operations may be made while achieving substantially similar results.

Terms of degree such as "substantially," "about," and "approximately" as used herein mean a reasonable amount of deviation of the modified term such that the end result is not significantly changed. These terms should be construed as including a deviation of at least +5% of the modified term if this deviation would not negate the meaning of the word it modifies.

The specific numerical values, ranges, materials, shapes, and other parameters described herein are exemplary in nature and may be modified while maintaining the fundamental principles of operation described. Variations and modifications will be apparent to those skilled in the art.

The terms "A or B," "at least one of A or/and B," "at least one of A and B," "at least one of A or B," or "one or more of A or/and B" used in the various embodiments of the present disclosure include any and all combinations of words enumerated with it. For example, "A or B," "at least one of A and B" or "at least one of A or B" may mean: (1) including at least one A, (2) including at least one B, (3) including either A or B, or (4) including both at least one A and at least one B.

What is claimed is:

1. A fastening system comprising:
   a bolt comprising:
      a head;
      a shaft member defining an axis of rotation, the shaft member including a plurality of holes extending through the shaft member parallel to the axis of rotation; and
      a locking member having a plurality of wings;
      the plurality of wings collectively having a cross section with a particular shape;
      the plurality of wings comprising:
         a first wing having a first tooth extending in a first angular direction about the axis of rotation; and
         a second wing having a second tooth extending in the first angular direction about the axis of rotation;
         the first tooth being angularly spaced from the second tooth about the axis of rotation;
   a receiving hole formed in a surface, the receiving hole comprising:
      an opening, having a cross-section with the particular shape, adapted to allow insertion of the bolt via the particular-shaped cross-section in an initial angular orientation, and
      underside surfaces, wherein upon rotation of the bolt from the initial angular orientation to a second angular orientation, the plurality of wings engage with the underside surfaces to prevent withdrawal of the bolt from the receiving hole while the bolt is in the second angular orientation; and
   a locking mechanism insertable into the at least one hole in the shaft member after rotation of the bolt to the second angular orientation, wherein insertion of the locking mechanism prevents rotation of the bolt relative to the receiving hole and prevents removal of the bolt from the receiving hole;
      wherein the locking mechanism includes a plurality of prongs that are insertable into the plurality of holes in the bolt;
   wherein the plurality of prongs are removable from the plurality of holes in the bolt by pushing the plurality of prongs from an interior side of the surface back through the plurality of holes in the bolt; and
   wherein, upon removing the locking mechanism from the plurality of holes in the bolt, the bolt is rotatable to the first angular orientation.

2. The fastening system of claim 1, wherein the plurality of holes consists of two holes.

3. The fastening system of claim 1, wherein the particular shape comprises a bowtie shape.

4. The fastening system of claim 3, wherein the underside surfaces of the receiving hole are disposed along an axis that aligns with an axis of the bowtie-shaped cross section of the two wings when the bolt is in the second angular orientation.

5. The fastening system of claim 1, wherein the plurality of wings consists of the first wing and the second wing.

6. The fastening system of claim 1, wherein the shaft member is cylindrical.

7. The fastening system of claim 1:
   wherein, when the bolt is in the initial angular orientation, the plurality of holes in the shaft member are not aligned with any opening through the surface; and
   wherein, when the bolt is rotated to the second angular orientation, the plurality of holes in the shaft member align with corresponding openings in the surface to create a continuous passthrough for receiving the locking mechanism.

8. The fastening system of claim 1:

wherein, when the locking mechanism is inserted into the plurality of holes in the shaft member:

the plurality of prongs create frictional engagement with inner surfaces of the receiving hole;

the plurality of prongs create frictional engagement with side surfaces of the wings;

the first and second wings create frictional engagement with additional inner surfaces of the receiving hole;

wherein the frictional engagement prevents withdrawal of the locking mechanism in a direction of insertion; and wherein positioning of the pins prevents rotation of the bolt from the second angular orientation to the initial angular orientation.

9. The fastening system of claim 1:

wherein the head has a width greater than a width of the shaft member;

wherein, when the bolt is locked into the surface via the locking mechanism, a portion of the shaft member extends from an exterior side of the surface to an inner surface of the head; and wherein the portion of the shaft member is configured to support an object between the exterior side of the surface and the inner surface of the head.

10. A fastening system comprising:

a bolt comprising:

a head;

a shaft member defining an axis of rotation, the shaft member including a plurality of holes extending through the shaft member parallel to the axis of rotation; and a locking member having a plurality of wings;

the plurality of wings collectively having a cross section with a particular shape;

the plurality of wings comprising:

a first wing having a first tooth extending in a first angular direction about the axis of rotation; and a second wing having a second tooth extending in the first angular direction about the axis of rotation;

the first tooth being angularly spaced from the second tooth about the axis of rotation;

a receiving hole formed in a surface, the receiving hole comprising:

an opening, having a cross-section with the particular shape, adapted to allow insertion of the bolt via the particular-shaped cross-section in an initial angular orientation, and underside surfaces, wherein upon rotation of the bolt from the initial angular orientation to a second angular orientation, the plurality of wings engage with the underside surfaces to prevent withdrawal of the bolt from the receiving hole while the bolt is in the second angular orientation; and a locking mechanism insertable into the at least one hole in the shaft member after rotation of the bolt to the second angular orientation, wherein insertion of the locking mechanism prevents rotation of the bolt relative to the receiving hole and prevents removal of the bolt from the receiving hole;

wherein the locking mechanism includes a plurality of prongs that are insertable into the plurality of holes in the bolt;

wherein the locking mechanism includes a pulling member coupled to the plurality of prongs;

wherein the locking mechanism is removable from the plurality of holes in the bolt by pulling the pulling member from an exterior side of the surface; and wherein, upon removing the locking mechanism from the plurality of holes in the bolt, the bolt is rotatable to the first angular orientation.

11. The fastening system of claim 10, wherein the plurality of holes consists of two holes.

12. The fastening system of claim 10, wherein the particular shape comprises a bowtie shape.

13. The fastening system of claim 12, wherein the underside surfaces of the receiving hole are disposed along an axis that aligns with an axis of the bowtie-shaped cross section of the two wings when the bolt is in the second angular orientation.

14. The fastening system of claim 10, wherein the plurality of wings consists of the first wing and the second wing.

15. The fastening system of claim 10, wherein the shaft member is cylindrical.

16. The fastening system of claim 10:

wherein, when the bolt is in the initial angular orientation, the plurality of holes in the shaft member are not aligned with any opening through the surface; and wherein, when the bolt is rotated to the second angular orientation, the plurality of holes in the shaft member align with corresponding openings in the surface to create a continuous passthrough for receiving the locking mechanism.

* * * * *